(12) United States Patent
Patterson et al.

(10) Patent No.: US 12,282,760 B2
(45) Date of Patent: *Apr. 22, 2025

(54) ACCELERATING APPLICATION AND SUB-PACKAGE INSTALLATIONS

(71) Applicant: Google LLC, Mountain View, CA (US)

(72) Inventors: Matthew Patterson, Mountain View, CA (US); Liyuan Gao, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,045

(22) Filed: Jul. 6, 2022

(65) Prior Publication Data

US 2022/0334815 A1 Oct. 20, 2022

Related U.S. Application Data

(63) Continuation of application No. 17/311,657, filed as application No. PCT/US2019/049316 on Sep. 3, 2019, now Pat. No. 11,416,232.

(51) Int. Cl.
*G06F 8/61* (2018.01)
*G06F 8/65* (2018.01)

(52) U.S. Cl.
CPC . *G06F 8/61* (2013.01); *G06F 8/65* (2013.01)

(58) Field of Classification Search
CPC ..................................... G06F 8/61; G06F 8/65
See application file for complete search history.

(56) References Cited

U.S. PATENT DOCUMENTS 5,619,698 A * 4/1997 Lillich .................. G06F 9/4484
712/E9.082
7,509,636 B2 3/2009 McGuire et al.
(Continued)

FOREIGN PATENT DOCUMENTS

CA 2786879 A1 5/2013
CN 1777867 A 5/2006
(Continued)

OTHER PUBLICATIONS

Response to Communication pursuant to Article 94(3) EPC dated Mar. 6, 2023, from counterpart European Application No. 19769344.3 filed Apr. 24, 2023, 39 pp.
(Continued)

*Primary Examiner* — Lewis A Bullock, Jr.
*Assistant Examiner* — Theodore E Hebert
(74) *Attorney, Agent, or Firm* — Shumaker & Sieffert, P.A.

(57) ABSTRACT

In some examples, a method includes downloading, from an application provider, a patch to be applied to a first application element and a stripped version of the application that does not include one or more application elements to be reused during installation of the application, decompressing the first application element to generate a decompressed version of the first application element, and decompressing the patch to generate a decompressed version of the patch. The method may also include applying the decompressed version of the patch to the decompressed version of the first application element to generate a patched application element, compressing the patched application element to generate a compressed patched application element, and installing the application using the compressed patched application element, the stripped version of the application, and the one (Continued)

or more application elements other than the first application element.

16 Claims, 5 Drawing Sheets

(56) References Cited

U.S. PATENT DOCUMENTS

| | | | |
|---|---|---|---|
| 7,665,081 B1* | 2/2010 | Pavlyushchik | G06F 8/658 |
| | | | 717/168 |
| 9,720,674 B1* | 8/2017 | Spreha | G06F 21/57 |
| 10,031,744 B2* | 7/2018 | Liang | G06F 16/183 |
| 10,048,959 B2* | 8/2018 | Sun | G06F 8/658 |
| 10,191,684 B2 | 1/2019 | Gopal et al. | |
| 10,200,502 B2* | 2/2019 | Liang | H04L 67/34 |
| 10,402,273 B2 | 9/2019 | Olinsky et al. | |
| 10,620,942 B2 | 4/2020 | Westerkowsky | |
| 10,834,207 B2* | 11/2020 | Acharya | H04L 12/40 |
| 10,853,054 B2 | 12/2020 | Clark | |
| 11,005,906 B2 | 5/2021 | Thomas et al. | |
| 11,416,232 B2* | 8/2022 | Patterson | G06F 8/61 |
| 2005/0132382 A1* | 6/2005 | McGuire | G06F 8/658 |
| | | | 719/311 |
| 2010/0257520 A1* | 10/2010 | Navarro | G06F 8/65 |
| | | | 717/173 |
| 2012/0089973 A1* | 4/2012 | Bhat | G06F 8/658 |
| | | | 717/169 |
| 2014/0007074 A1* | 1/2014 | Sporkert | G06F 8/658 |
| | | | 717/172 |
| 2014/0007075 A1* | 1/2014 | Sporkert | G06F 8/658 |
| | | | 717/173 |
| 2015/0220318 A1 | 8/2015 | Mangaiahgari | |
| 2019/0020731 A1* | 1/2019 | Govindankutty | H04L 67/10 |
| 2019/0057214 A1* | 2/2019 | Xia | H04W 12/06 |
| 2019/0286437 A1* | 9/2019 | Mahbod | G06F 8/71 |
| 2020/0293634 A1* | 9/2020 | Tsao | G06F 21/51 |
| 2020/0341751 A1* | 10/2020 | Mahbod | G06F 8/71 |
| 2021/0141711 A1* | 5/2021 | Leibman | G06F 8/65 |
| 2022/0137944 A1* | 5/2022 | Patterson | G06F 8/65 |
| | | | 717/170 |

FOREIGN PATENT DOCUMENTS

| | | |
|---|---|---|
| CN | 108886511 A | 11/2018 |
| EP | 2680135 A1 | 1/2014 |

OTHER PUBLICATIONS

Response to Examination report from counterpart India Application No. 202147027269 dated Apr. 19, 2022, filed Jun. 28, 2022, 22 pp.
Notice of Intent to Grant and Text Intended to Grant from counterpart European Application No. 19769344.3 dated May 31, 2023, 5 pp.
Communication pursuant to Article 94(3) EPC from counterpart European Application No. 19769344.3 dated Mar. 6, 2023, 4 pp.
Prosecution History from U.S. Appl. No. 17/311,657 dated Jun. 7, 2021 through May 26, 2022, 37 pp.
Examination report from counterpart India Application No. 202147027269 dated Apr. 19, 2022, 8 pp.
International Preliminary Report on Patentability from International Application No. PCT/US2019/049316, dated Mar. 17, 2022, 10 pp.
International Search Report and Written Opinion of International Application No. PCT/US2018/041398, mailed Jun. 5, 2020, 15 pp.
Response to Communication Pursuant to Rules 161(1) and 162 EPC dated Nov. 15, 2021, from counterpart European Application No. 19769344.3, filed Dec. 14, 2021, 19 pp.
Extended Search Report from counterpart European Application No. 23189699.4 dated Nov. 29, 2023, 7 pp.
Notice of Intent to Grant from counterpart Indian Application No. 202147027269 dated Feb. 19, 2024, 1 pp.
First Office Action and Search Report, and translation thereof, from counterpart Chinese Application No. 201980088644.1 dated Apr. 9, 2024, 11 pp.
Response to Extended Search Report dated Nov. 29, 2023, from counterpart European Application No. 23189699.4 filed Jun. 25, 2024, 35 pp.
Notice of Intent to Grant, and translation thereof, from counterpart Chinese Application No. 201980088644.1 dated Sep. 23, 2024, 4 pp.
Notice of Intent to Grant and Text Intended to Grant from counterpart European Application No. 23189699.4 dated Jan. 20, 2025, 65 pp.

* cited by examiner

ACCELERATING APPLICATION AND SUB-PACKAGE INSTALLATIONS

RELATED APPLICATION

This application is a continuation of U.S. patent application Ser. No. 17/311,657, filed Jun. 7, 2021, which is a 371 Application of International Application No. PCT/US2019/049316, filed Sep. 3, 2019, the contents of each of which are hereby incorporated by reference.

BACKGROUND

Computing devices can perform various functions, such as executing applications, receiving user input, and outputting information for display. For instance, computing devices may execute applications, such as an email client, travel assistant, messaging client, and the like. Software developers may write such applications in human-readable source code that is compiled into machine-readable code. In some instances, machine-readable code may be organized into discrete executable components, such as compiled classes in an object-oriented design. An application may include one or more executable components that implement various functionality. In some distributed environments, a user computing device (e.g., a smartphone) may use a media store application to search for and install applications, which are provided by a remote computing system. Typically, when a user selects an application in the media store application to install at the user computing device, the remote computing system sends a single file that includes all of the executable components to perform all functionality of the application, regardless of whether the user actually uses all the functionality. As applications grow in size, the amount of time needed to download and install such applications may grow, thereby requiring a user to wait greater amounts of time to install and execute applications. More network resources may also be used in transmitting the application to the user computing device.

SUMMARY

In general, techniques of this disclosure may enable the computing device to more efficiently download applications, including applications split into various sub-packages having discrete sets of functionality, by leveraging the content of applications that are already installed at the computing device. When the computing device requests an application that is to be installed at the computing device from an application provider server, the application provider server may not necessarily send every one of the application elements of the application or a particular application sub-package of the application to the computing device to install the application or application sub-package. Instead, the application provider server may determine whether one or more application elements of the application or application sub-package can be obtained from other applications or application sub-packages that are already installed at the computing device. The use of network resources may therefore be reduced. In some instances, those application elements need to be updated or "patched" in order for the application being installed to use those application elements already stored on the device. However, if those application elements are stored in a compressed format, it may be difficult to update or "patch" those application elements to the version required for the application being installed. Current compression schemes tend to cascade small local changes to a file within an application element into large global changes, resulting in a patched version of the application element that is larger in size than the application would otherwise be. In devices with limited storage and memory, such as a mobile computing device, larger application sizes can be disadvantageous. Thus, to avoid creating large size patched applications, the application elements that may be re-used from applications already installed on the device may be limited to uncompressed application elements. Such a limitation may limit the number of application elements that can be reused as most application elements, such as libraries, are stored in a compressed format. In turn, this limits the implementation of the (more network efficient) approach to downloading applications described above.

Techniques of this disclosure can enable reuse of compressed application elements that require patching without cascading the small local changes into large global changes. As such, the resulting patched compressed application element may be smaller (i.e., require fewer bytes of storage) than if the compressed application elements were patched using conventional techniques. Storage and memory on the user computing device may therefore be more efficiently used.

Responsive to determining that one or more application elements are available from at least one other application or application sub-package (already installed on the device), the application provider server may create a stripped version of the application or application sub-package being installed (i.e., a version of the application or application sub-package that does not include the application elements available at the computing device) as well as any patches that may be required to update the application element. The computing device may establish two download streams with one or more servers of the application provider and then initiates downloads of the patches using one download stream and download of the stripped application or application sub-package using the other download stream. While the stripped application or application sub-package and the patches are downloading, the computing device may decompress the application elements that are going to be reused and that need to be patched before they can be reused. Once each patch is downloaded to the computing device, the computing device may decompress the downloaded patches, apply the patches, and then begin recompressing the patched application elements. As the patches are much smaller than the stripped application or application sub-package, and so take less time to download, the application elements may typically be decompressed, patched, and then recompressed before the stripped application or application sub-package finishes downloading.

In this way, the techniques of this disclosure may reduce the amount of data that is sent from the application provider server and received by the computing device to install an application or application sub-package at the computing device. The use of network resources may therefore be reduced. Rather than limiting the application elements that can be shared between applications to uncompressed application elements, techniques of this disclosure enable the application provider to exclude compressed component elements from the stripped application or stripped application sub-package that is sent to the computing device (because the compressed component elements already stored on the device can now be used), which can further reduce the use of network resources since less data is being transmitted. Further, the techniques may enable such reduction in the data downloaded to the computing device with minimal, if any, increase in application install time or, in various instances, a reduction in application install time.

Accordingly, the described techniques may improve the functioning of the computing device, as well as a computing system that includes the computing device and the application provider server. By reusing application elements of applications or application sub-packages that are already installed at the computing device to install or update an unrelated application, the described techniques reduces the amount of network bandwidth that is used to transfer elements of the application that is to be installed at the computing device, and may increase the speed of application installs at the computing device.

In some examples, a method includes receiving, by a computing device, a user input to install an application that is not currently installed at the computing device, wherein a plurality of applications are currently installed at the computing device, and wherein each of the plurality of applications includes a respective plurality of application elements, and, responsive to receiving the user input, send, to an application provider, a request to install the application; receiving, from the application provider, an indication of one or more application elements from the respective plurality of application elements included in the plurality of applications currently installed at the computing device, wherein the one or more application elements are to be reused during installation of the application, wherein the one or more application elements include a first application element that is to be updated from a current version to a different version required by the application, and wherein the first application element is stored at the computing device in a compressed format. The method may also include downloading, by the computing device and from the application provider, a patch to be applied to the first application element and a stripped version of the application that does not include the one or more application elements to be reused during installation of the application, decompressing, by the computing device, the first application element to generate a decompressed version of the first application element, decompressing, by the computing device, the patch to generate a decompressed version of the patch; applying, by the computing device, the decompressed version of the patch to the decompressed version of the first application element to generate a patched application element, compressing, by the computing device, the patched application element to generate a compressed patched application element that is the different version of the first application element required by the application, and installing, by the computing device, the application at the computing device using the compressed patched application element, the stripped version of the application, and the one or more application elements other than the first application element.

In some examples, a computing device includes one or more processors; a presence-sensitive display that detects a user input to install an application that is not currently installed at the computing device, a communication unit, and a computer-readable storage medium that stores instructions including a plurality of applications, wherein each of the plurality of applications includes a respective plurality of application elements. The instructions, when executed by the one or more processors, causes the one or more processor to: responsive to receiving the user input, send, to an application provider via the communication unit, a request to install the application; receive, from the application provider via the communication unit, an indication of one or more application elements from the respective plurality of application elements included in the plurality of applications currently installed at the computing device, wherein the one or more application elements are to be reused during installation of the application, wherein the one or more application elements include a first application element that is to be updated from a current version to a different version required by the application, and wherein the first application element is stored at the computing device in a compressed format. The instructions further cause the one or more processors to: retrieve, from the application provider via the communication unit, a patch to be applied to the first application element and a stripped version of the application that does not include the one or more application elements to be reused during installation of the application, decompresses the first application element to generate a decompressed version of the first application element, decompresses the patch to generate a decompressed version of the patch; applies the decompressed version of the patch to the decompressed version of the first application element to generate a patched application element, compresses the patched application element to generate a compressed patched application element that is the different version of the first application element required by the application, and install the application at the computing device using the compressed patched application element, the stripped version of the application, and the one or more application elements other than the first application element A non-transitory computer-readable storage medium (and/or a computer program product) encoded with instructions that, when executed, cause one or more processors of a computing device to: receive an indication of a user input to install an application that is not currently installed at the computing device, wherein a plurality of applications are currently installed at the computing device, and wherein each of the plurality of applications includes a respective plurality of application elements; responsive to receiving the indication of the user input, send, to an application provider, a request to install the application, and receive, from the application provider, an indication of one or more application elements from the respective plurality of application elements included in the plurality of applications currently installed at the computing device, wherein the one or more application elements are to be reused during installation of the application, wherein the one or more application elements include a first application element that is to be updated from a current version to a different version required by the application, and wherein the first application element is stored at the computing device in a compressed format. The instructions further cause the one or more processors to download, from the application provider, a patch to be applied to the first application element and a stripped version of the application that does not include the one or more application elements to be reused during installation of the application, decompress the first application element to generate a decompressed version of the first application element, decompress the patch to generate a decompressed version of the patch, apply the decompressed version of the patch to the decompressed version of the first application element to generate a patched application element, compress the patched application element to generate a compressed patched application element that is the different version of the first application element required by the application, and install the application at the computing device using the compressed patched application element, the stripped version of the application, and the one or more application elements other than the first application element The details of one or more examples are set forth in the accompanying drawings and the description below. Other

DETAILED DESCRIPTION

Figure 1:
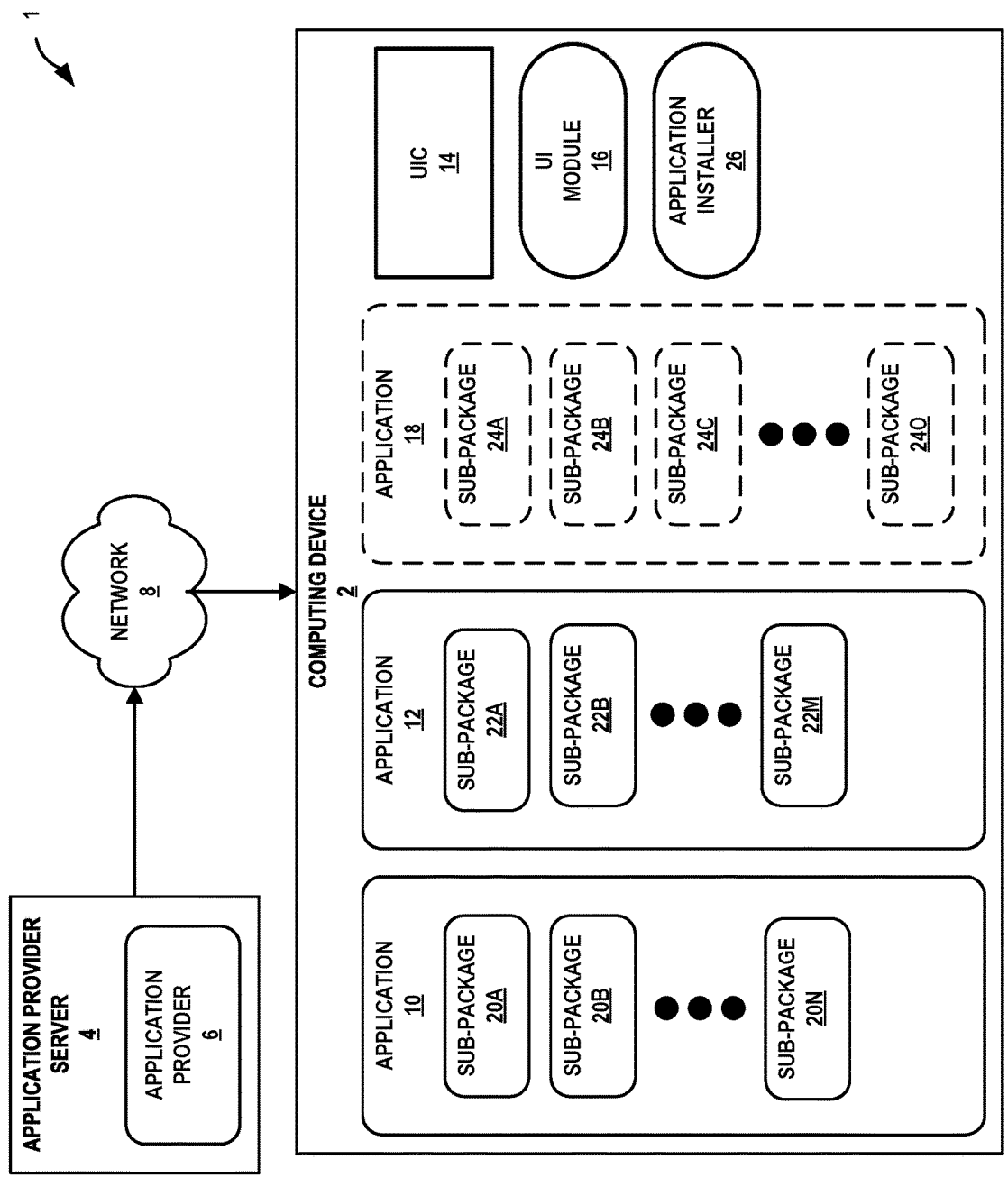
FIG. 1 is a conceptual diagram illustrating an example computing system in which a computing device can download an application from an application provider server and can install the downloaded application at the computing device, in accordance with one or more aspects of the present disclosure.

FIG. 1 is a conceptual diagram illustrating an example computing system in which a computing device can download an application from an application provider server and can install the downloaded application at the computing device, in accordance with one or more aspects of the present disclosure. As shown in FIG. 1, computing system 1 may include computing device 2 and application provider server 4. Computing device 2 may communicate with application provider server 4 via network 8 to download applications such as application 18, and may install the downloaded applications, such as application 18, at computing device 2. Network 8 represents any public or private communications network, for instance, cellular, Wi-Fi, and/or other types of networks, for transmitting data between computing systems, servers, and computing devices. Application provider server 4 may exchange data, via network 8, with computing device 2 to transfer applications to be installed on computing device 2 when computing device 2 is connected to network 8.

Network 8 may include one or more network hubs, network switches, network routers, or any other network equipment, that are operatively inter-coupled thereby providing for the exchange of information between application provider server 4 and computing device 2. Computing device 2 and application provider server 4 may transmit and receive data across network 8 using any suitable communication techniques. Computing device 2 and application provider server 4 may each be operatively coupled to network 8 using respective network links. The links coupling computing device 2 and application provider server 4 to network 8 may be Ethernet or other types of network connections and such connections may be wireless and/or wired connections.

Application provider server 4 may represent any suitable remote computing system, such as one or more desktop computers, laptop computers, mainframes, servers, cloud computing systems, etc. capable of sending and receiving information both to and from a network, such as network 8. In some examples, digital assistant server 160 may represent cloud computing systems that provide access to their respective services via a cloud.

Application provider server 4 hosts (or at least provides access to) application provider 6. Application provider 6 may perform operations described using hardware or a mixture of hardware, software, and firmware residing in and/or executing at application provider server 4. Application provider server 4 may execute application provider 6 with multiple processors or multiple devices. Application provider server 4 may also execute application provider 6 as virtual machines executing on underlying hardware. In some examples, application provider 6 may also execute as one or more services of an operating system or computing platform, or as one or more executable programs at an application layer of a computing platform.

Application provider 6 may execute at application provider server 4 to manage a repository of applications that may be downloaded to computing devices, and the installation and update of applications downloaded from application provider 6. Application provider 6 may receive requests for applications from computing devices, such as computing device 2, and to transfer the requested applications to the requesting computing devices for installation. Application provider 6 may also generate patches that are transferred to computing devices to update applications that are installed at the computing devices.

Computing device 2 may be a mobile or non-mobile computing device that is configured to request applications from application provider server 4, to receive the requested applications from application provider server 4, and to install the applications requested and received from application provider server 4. Examples of computing device 2 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistant (PDA), a gaming system, a media player, an e-book reader, a mobile television platform, an automobile navigation or infotainment system, or any other type of mobile, non-mobile, wearable, and non-wearable computing device.

In the example of FIG. 1, computing device 2 may include user interface component (UIC) 14, UI module 16, application installer 26, and applications 10 and 12. UI module 16, application installer 26, and applications 10 and 12 may perform operations described using hardware, or a combination of hardware and software and/or firmware residing in and/or executing at computing device 2. Computing device 2 may execute UI module 16, application installer 26, and applications 10 and 12 with multiple processors or multiple devices. In some cases, computing device 2 may execute UI module 16 and/or application installer 26 as virtual machines executing on underlying hardware. UI module 16 and/or application installer 26 may also execute as one or more services of an operating system or computing platform, or as one or more executable programs at an application layer of a computing platform.

UIC 14 of computing device 2 may function as an input and/or output device for computing device 2. UIC 14 may be implemented using various technologies. For instance, UIC 14 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UIC 14 may function as input devices using microphone or other transducer technologies, infrared sensor technologies, or other input device technology for use in receiving user input. For example, UIC 14 may detect, using built-in microphone technology, voice input. As another example, UIC 14 may include a presence-sensitive display that may receive tactile input from a user of computing device 2. UIC 14 may receive indications of tactile input by detecting one or more gestures from a user (e.g., the user touching or pointing to one or more locations of UIC 14 with a finger or a stylus pen).

UIC 14 may function as output (e.g., display) devices and present output to a user. UIC 14 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 2. UIC 14 may function as output device using speaker technologies, haptic feedback technologies, or other output device technology for use in outputting information to a user. UIC 14 may present a user interface provided by application installer 26, application 10, or application 12. UIC 14 may present a user interface related to other features of computing platforms, operating systems, applications, and/or services executing at and/or accessible from computing device 2 (e.g., e-mail, chat, online services, telephone, gaming, etc.).

UI module 16 may manage user interactions with UIC 14 and other components of computing device 2. UI module 16 and UIC 14 may receive one or more indications of input (e.g., voice input, gesture input, etc.) from a user as the user interacts with the user interface, at different times and when the user and computing device 2 are at different locations. UI module 16 and UIC 14 may interpret inputs detected at UIC 14 and may relay information about the inputs detected at UIC 14 to application installer 26, application 10, application 12, and/or one or more other associated platforms, operating systems, applications, and/or services executing at computing device 2 to, for example, to cause computing device 2 to perform functions.

UI module 16 may cause UIC 14 to output, display, or otherwise present a user interface while a user of computing device 2 views output and/or provides input at UIC 14. For example, as shown in FIG. 1, UI module 16 may send instructions to UIC 14 that cause UIC 14 to display a graphical user interface (GUI), at a display screen of UIC 14. In other examples, UI module 16 may also cause UIC 14 to output a user interface in non-visual form, such as audio output. For example, if computing device 2 is an audio player device, UI module 16 may send instructions to UIC 14 that cause UIC 14 to output audio.

UI module 16 and UIC 14 may receive one or more indications of input (e.g., voice input, touch input, non-touch or presence-sensitive input, video input, audio input, etc.) from a user as the user interacts with the user interface output by UIC 14, at different times and when the user and computing device 2 are at different locations. UI module 16 and UIC 14 may interpret inputs detected at UIC 14 and may relay information about the inputs detected at UIC 14 to application installer 26, application 10, application 12, and/or one or more other associated platforms, operating systems, applications, and/or services executing at computing device 2, for example, to cause computing device 2 to perform functions.

UI module 16 may also receive information and instructions from one or more associated platforms, operating systems, applications, and/or services executing at computing device 2 and/or one or more remote computing systems, such as application provider server 4. For example, UI module 16 may receive information (e.g., audio data, text data, image data, etc.) and instructions for presenting a user interface.

Applications 10 and 12 may be applications that are currently installed at computing device 2. While FIG. 1 illustrates two applications that are currently installed at computing device 2, it should be understood that any number of applications may be installed at computing device 2, and that computing device 2 is not necessarily limited to only having two applications be installed at computing device 2.

Applications 10 and 12 include sub-packages 20A-20N (collectively "sub-packages 20") and sub-packages 22A-22M (collectively "sub-packages 22"), respectively. Each of sub-packages 20 and 22 are installable application sub-packages that provide discrete sets of functionality for applications 10 and 12. As an example, a software developer may design application 10 (e.g., a navigation application) with discrete sets of functionality. Application 10 may include a turn-by-turn navigation user interface, a point-of-interest user interface (e.g., displaying details for a point of interest on a map), and a settings user interface. The software developer may design application 10 with three different sub-packages (e.g., sub-packages 20A, 20B, and 20N), where each sub-package 20 includes a set of executable components to implement the functionality for the respective user interface.

While all of sub-packages 20 for application 10 collectively may be large in size, computing device 2 may retrieve, install, and execute only those sub-packages 20 necessary to provide functionality requested by a user. As such, when installing and/or executing application 10, only a portion of sub-packages 20 for application 10 need to reside locally at the computing device for application 10 to execute. For example, only sub-package 20A may be installed when application 10 is initially installed. Other sub-packages, such as sub-packages 20B-20N may include functionality that is not used (i.e., unused) by the user. That is, the functionality provided by one or more of sub-packages 20B-20N may not have been requested or used by the user since application 10 was initially installed. Thus, when the user initially requests the functionality provided by one or more of sub-packages 20B-20N, the one or more of sub-packages 20B-20N may be installed (i.e., installed on demand). In some examples, if the user does not use the functionality provided by one or more of sub-packages 20B-20N for at least a threshold duration of time (e.g., one day, one week, one month, one year, etc.), the corresponding one or more of sub-packages 20B-20N may be uninstalled from computing device 2. In such examples, the next time the user requests the functionality provided by the uninstalled one or more of sub-packages 20B-20N, the uninstalled one or more of sub-packages 20B-20N may be reinstalled (i.e., reinstalled on demand).

When a user requests additional functionality for the application, computing device 2 may automatically retrieve the needed sub-packages 20 that provide the requested functionality (e.g., sub-package 20B, sub-package 20N, etc.). Computing device may automatically retrieve and install the needed sub-packages 20 while application 10 is currently executing at computing device 2. In this way, applications may install and load more quickly because the entire set of sub-packages for the application need not be retrieved and installed if only a subset of the application's functionality is needed. Network, computing, and storage resources for the install may therefore be reduced as compared to retrieving the entire application. Applicant notes that while, in various instances, the techniques of this disclosure are described with respect to applications, the same techniques may be applied to application sub-packages (for example, to provide a certain functionality, a stripped version of an application sub-package may be provided and installed using a patched version of another application sub-package already installed on the device). As such, even though a particular technique is specifically described with respect to an application, Applicant is not limiting the description of the techniques to just being applicable to certain applications unless specifically noted.

Applications and application sub-packages that are installed at computing device 2 may each include one or more application elements. Application elements of an application may include code that is used when executing the application. For example, application elements may include executable code and libraries that are executed by computing device 2 to execute the application, resources (e.g., images, textures, files, scripts, uncompiled code, etc.) that are accessed during execution of the application, and the like. Typically, the application elements are included in the application or the application sub-packages in a compressed form. That is, many or most of the application elements, such as libraries, are stored in a compressed format when the application or application sub-package is installed at computing device 2. It should be understood that the application elements of an application may not be accessible by other applications without explicit permission of the application containing the application elements. Thus, the application elements of an application do not include shared libraries or other data that is accessed by multiple different applications. As such, application 10 may not be able to access the application elements of application 12, and application 12 may not be able to access the application elements of application 10. In some examples, applications in computing device 2 may execute in a sandboxed environment, which isolates the application elements of an application from other applications.

In some examples, application elements may be one or more of four types of content: binary content, resources, managed code, and compiled resources. Binary content may refer to native code that is specific to the architecture of the one or more processors of computing device 2. For example, applications 10 and 12 may include native code for a variety of platforms including the computing device. Resources may include image content, audio content, video content, and the like. For example, while application 10 or application 12 executes at computing device 2, applications 10 or 12 may output such image content, audio content, and/or video content at UIC 14.

Compiled resources may be resources that are compiled, such as strings or extensible markup language (XML) files that are compiled into compiled resources. Managed code may be compiled code that is not architecture-specific, and that can be executed by a virtual machine, such as compiled Java code, compiled Dalvik Executable code, and the like. In some examples, an application may include both managed code and native code as application elements. For example, the application may include one or more libraries that are written in native code, and may also include one or more other libraries that are written in managed code.

Application installer 26 may be executed by one or more processors (such as processors 36 of FIG. 2) to install and update applications at computing device 2. Application installer 26 may perform the functions of an application marketplace application that allows users to interact with application installer 26 via UIC 14 to browse, download, and install applications from an application provider server, such as application provider server 4. UIC 14 may receive input indicative of a request to install application 18 at computing device 2, and UI module 16 may forward to application installer 26 the request to install application 18 at computing device 2.

In accordance with aspects of the present disclosure, computing device 2 may download applications or application sub-packages from application provider server 4 for installation at computing device 2 in a way that leverages application elements of applications or application sub-packages that are currently installed at computing device 2. In the example of FIG. 1, in order to install application 18, application installer 26 may execute at computing device 2 to send a request to application provider 6 at application provider server 4 to download application 18 from application provider server 4 to computing device 2, which request may be in response to a user input to install an application (optionally to provide a particular application functionality) that is not currently installed at the computing device. When the user input is a request for previously unused functionality of the particular application, i.e. corresponds to a request for install of one or more sub-packages providing a discrete set of functionality, the user input may be received while the particular application is executing at the computing device. When application installer 26 has received and/or obtained at least one application sub-package 24A-24O (collectively, "application sub-packages 24") of application 18, application installer 26 may install application 18 at computing device 2. When the user input is a request for previously unused functionality of the particular application, the download and installation may be performed while the particular application is executing at the computing device. This on-the-fly approach to sub-package installation may improve utilization of resources of a mobile computing device without affecting user experience.

In response to receiving the request from computing device 2 to download an application (e.g., application 18) to computing device 2, application provider 6 may determine whether one or more application elements of the application to be downloaded can be obtained from one or more applications that are already currently installed at computing device 2 (i.e. whether one or more of sub-packages 20 and/or 22 can be used in placed of one or more of sub-packages 24). Responsive to determining that one or more application elements of the application to be downloaded are available from one or more applications that are already currently installed at computing device 2, application provider 6 may refrain from sending every application element of the application to computing device 2 when one or more of application elements of the application can be obtained from the one or more applications that are already currently installed at computing device 2. In this way, application provider 6 may refrain from sending every application element of the application to computing device 2 if one or more application elements of the application can be obtained from the one or more applications that are already currently installed at computing device 2.

Application provider 6 may determine which applications and which application sub-packages are currently installed at computing device 2, and may also determine the application elements of the applications that are currently installed at computing device 2. For example, application provider 6 may access information stored at application provider server 4 regarding the applications that are currently installed at application 18, or may receive from computing device 2 indications of the applications that are currently installed at computing device 2. Application provider 6 may, based on such determinations, determine the one or more application elements that can be obtained from applications that are currently installed at computing device 2, and may determine whether it should refrain from transmitting those one or more application elements to computing device 2. Where the application provider 6 is to refrain from transmitting the application elements, the application provider 6 may instead transmit an indication of the one or more application elements currently installed at the computing device which are to be reused during installation of the application 18.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In the example of FIG. 1, the user of computing device 2 may control the information regarding computing device 2 that is collected by application provider 6. For example, the user may control whether application provider 6 is able to receive and/or access information associated with computing device, such as the information regarding the applications that are currently installed at computing device 2. The user may also control the level of access that application provider 6 has to such information. In some instances, application provider 6 may be able to receive and/or access information regarding the applications that are currently installed at computing device 2 and/or to receive and/or access information associated with computing device 2 only after receiving explicit consent of the user of computing device 2.

In the example of FIG. 1, application provider 6 may determine whether one or more application elements of application 18 can be obtained from applications 10 and 12 that are already currently installed at computing device 2. For example, application provider 6 may access information that indicates the one or more applications (e.g., applications 10 and 12) that are currently installed at computing device 2, as well as information that indicates the application elements of such applications that are currently installed at computing device 2. Such information may be stored at application provider server 4 or at another location (e.g., another remote server) that is accessible by application provider 6. Application provider 6 may read such information and may determine one or more application elements of application 18 that can be obtained from one or more applications that are already installed at computing device 2.

Application provider 6 may determine that an application element of application 18 can be obtained from an application that is already installed at computing device 2 if the application that is already installed at computing device 2 has an application element that is the same as the application element of application 18. For example, if an application element of application 18 is a library, application provider 6 may determine that the library can be obtained from the application that is already installed at computing device 2. In another example, if an application element of application 18 is a video file, and if the same video file already exists in an application that is already installed at computing device 2, application provider 6 may determine that the video file can be obtained from the application that is already installed at computing device 2.

Application provider 6 may also determine that an application element of application 18 can be obtained from an application that is already installed at computing device 2 when the application that is already installed at computing device 2 has an application element that can be modified, such as via a patch, to become an application element that is identical to the application element of application 18. For example, if an application element of application 18 is a up-to-date version of a library, and if an application element of an application that is already installed at computing device 2 contains an older version of the same library, computing device 2 may be able to obtain the up-to-date version of the library from the application that is already installed at computing device 2 by updating the older version of the library to the up-to-date version of the library. In this example, application provider 6 may generate a patch to update the older version of the library to the up-to-date version of the library, and may send the patch to computing device 2, so that computing device 2 may apply the patch to the older version of the library to update it to the up-to-date version of the library.

When application provider 6 determines that an application element of application elements can be obtained (or, in other words, is available) from an application that is already installed at computing device 2, application provider 6 may determine whether to request that computing device 2 obtain the application element from the application that is already installed at computing device 2, and to install application 18 using the obtained application element, or whether application provider 6 is to nonetheless send the application element of application elements to computing device 2. Application provider 6 may make the determination based at least in part on a variety of factors such as user sensitivity to download time, the network bandwidth available to computing device 2, the type of network connection that computing device 2 has, the available processing power of computing device 2, the remaining battery life of computing device 2, the location of computing device 2, the memory and storage limitations of computing device 2, and the like.

In some examples, application provider 6 may generate a profile of computing device 2 based on these and other factors. Using the profile, application provider 6 may determine whether to direct computing device 2 to obtain the application element from the application that is already installed at computing device 2, and to install application 18 using the obtained application element, or whether application provider 6 is to nonetheless send the application element of application 18 to computing device 2

For example, application provider 6 may send a request to computing device 2 to obtain application elements from applications that are already installed at computing device 2 if computing device 2 is connected to application provider 6 via a cellular data connection, and may send the application elements to computing device 2 if computing device 2 is connected to application provider 6 via Wi-Fi. In a further example, application provider 6 may send a request to computing device 2 to obtain application elements from applications that are already installed at computing device 2 if computing device 2 is connected to application provider 6 via a metered network connection, and may send the application elements to computing device 2 if computing device 2 is connected to application provider 6 via an unmetered network connection or a network connection with unlimited data. In another example, application provider 6 may determine the amount of network bandwidth that is available to computing device 2, and may send the application elements to computing device 2 if computing device 2's available network bandwidth is above a threshold.

In another example, if the amount of remaining battery life of the computing device 2 is less than a threshold, application provider 6 may send a request to computing device 2 to obtain application elements from applications that are already installed at computing device 2 if computing device 2 is connected to application provider 6 via a cellular data connection, and may send the application elements to computing device 2 if computing device 2 is connected to application provider 6 via Wi-Fi, because Wi-Fi may be relatively more power efficient than a cellular data connection.

In some instances, application 18 may already be installed at computing device 2 but one or more of sub-packages 24 are not installed at computing device 2. Instead of an initial request to install application 18, a user of computing device 2 may be requesting usage of additional functionality of application 18 that is provided in a sub-package of application 18, such as sub-package 24B, that is not currently installed at computing device 2. In such instances, application provider 6 may determine the application elements included in application sub-package 24B and determine whether any of the application elements are included in other sub-packages 20, 22 or applications 10, 12 already installed at computing device 2.

When application provider 6 determines that computing device 2 is to obtain an application element from an application or application sub-package that is already installed at computing device 2, application provider 6 may send to computing device 2 a request to obtain the application element of application 18 from an application that is already installed at computing device 2. The request may identify the application element of application 18 that can be obtained from an application that is already installed at computing device 2, identify the application element of the application that is already installed at computing device 2, identify the location of the application element of the application that is already installed at computing device 2, and the like. In other words, the computing device 2 may receive, from the application provider, an indication of one or more application elements currently installed at the computing device which are to be reused during installation of the application 18. If necessary, application provider 6 may also send a patch to computing device 2 that may be used to update the application element of the application that is already installed at computing device 2, so that the application element, as patched, is the same as an application element of application elements. For example, the one or more application elements may include an application element that is to be updated from a current version to a different version required by the application 18 by applying the patch to the application element to generate a patched application element.

In this way, application provider 6 may send to computing device 2, and computing device 2 may receive from application provide 6, indications of the one or more application elements of application 18 that can be obtained from applications that are already installed at computing device 2, along with one or more patches that computing device 2 may apply to one or more application elements of the applications that are already installed at computing device 2, in order to obtain the one or more application elements of application 18 from the applications that are already installed at computing device 2.

Computing device 2 may receive from application provider 6 one or more application elements of application 18. If application provider 6 determines that computing device 2 is to obtain one or more application elements from one or more of the applications that are already installed at computing device 2, then computing device 2 may also receive from application provider 6 a request to obtain one or more application elements of application 18 from one or more of the applications that are already installed at computing device 2.

The request received by computing device 2 may indicate the one or more application elements of the one or more applications that are already installed at computing device 2 that correspond to the one or more application elements of application 18 that are to be obtained from one or more of the applications that are already installed at computing device 2. An application element of an application that is already installed at computing device 2 may correspond to an application element of application 18 if computing device 2 can generate the application element of application 18 such as by making a copy of the corresponding application element or by applying a patch to the corresponding application element.

The request may include identifying information for each of the one or more application elements of the one or more applications that are already installed at computing device 2, such as the names or other identifying information associated with the one or more applications and/or the one or more application elements, the storage locations (e.g., directory path) of the one or more application elements in the storage devices included in or operably coupled to computing device 2, and the like.

The request may also specify how the one or more application elements of application 18 are to be obtained from the corresponding application elements of the one or more applications that are already installed at computing device 2. In one example, if a corresponding application element of the one or more applications that are already installed at computing device 2 is identical to an application element of application 18, the application element of application 18 can be obtained by making a copy of the corresponding application element, and by utilizing the copy of the corresponding application element as the application element of application 18.

In another example, if obtaining an application element of application 18 from a corresponding application element of the one or more applications that are already installed at computing device 2 includes patching the corresponding application element, computing device 2 may receive one or more patches from application provider 6 that computing device 2 may apply to the corresponding application element in order to obtain the application elements of application 18. Computing device 2 may apply the patch to the corresponding application element and may utilize the patched copy of the corresponding application element (i.e. the patched application element) as the application element of application 18.

In one example, application 18 that is to be installed at computing device 2 may include application sub-packages 24A and 24B. When sending the request to install application 18, computing device 2 may initiate two or more download streams from application provider 6. Each of the two or more download streams may be used to download different portions of application 18 from application provider 6. For example, one download stream may be used to download a stripped version of sub-package 24A and another download stream may be used to download patches that need to be applied to application elements already installed at computing device 2 in order for application sub-package 24A to use the application elements.

In this example, application sub-package 24A provides the core functionality of application 18 and is required to execute application 18. Application provider 6 may determine that an application element of application sub-package 24A can be obtained from the applications or application sub-packages that are already installed at computing device 2 and that the application element needs to be patched before being usable by application sub-package 24A. In response, application provider 6 may generated a stripped version of application sub-package 24A that does not include the application element already installed at computing device 2. In some instances, even though the stripped version of application sub-package 24A is already compressed using a standard compression algorithm, application provider 6 may apply a second, different compression algorithm to generate a further compressed and, thus, smaller in size, version of the stripped application sub-package in order to further reduce the amount of data required to be sent to computing device 2 and make more efficient use of network resources and computing resources like memory, storage, and processing capability.

Application provider 6 may also generate a patch that will be applied by computing device 2 to the application element already installed in order to change the application element into the version of the application element required by application sub-package 24A. Application provider 6 compresses the patch and sends the patch to computing device 2 using one of the download streams established with computing device 2. Application provider 6 also sends the stripped version of application sub-package 24A to computing device 2 using another one of the download streams established with computing device 2. Typically, the compressed patch will be smaller in size than the stripped version of application sub-package 24A and, thus, will require less time to transmit to computing device 2.

As applying patches to compressed application elements, such as libraries, produces patched versions of the elements that are inefficient (i.e., larger in size than if the patch were applied to an uncompressed version of the same application element), it is preferable to apply patches to uncompressed versions of the application elements. Thus, in accordance with the techniques of this disclosure, while application provider 6 is creating and sending the patch and the stripped version of application sub-package 24A, computing device 2 may create copies of the one or more application elements that are going to be reused by application sub-package 24A. If any of the application elements are stored in a compressed format at computing device 2, computing device 2 may decompress the copy of the compressed application element(s). In various instances, it may take less time to create a copy of the application elements and decompress the copies of the compressed application element(s) than is required to download the patches.

Once each patch is downloaded to computing device 2, computing device 2 decompresses each patch and applies the uncompressed patch to the corresponding uncompressed copy of the application element to generate a patched application element. In instances where application sub-package 24A requires that the application element be stored in a compressed format, after the patch is applied, computing device 2 recompresses the patched version of the application element (to form a compressed patched application element). Typically, this download, decompression, patching, and recompression process requires less time than is required to download the stripped version of application sub-package 24A. In this way, techniques of this disclosure enable usage of compressed application elements already installed at computing device 2 even though the compressed application elements may require patching before being usable by application sub-package 24A and without producing suboptimal patched versions of the application elements. The computing device 2 can then install the application using the compressed patched application element, and any other application elements needed, and the stripped version of the application or application sub-package. Further, by downloading, decompressing, patching, and recompressing the application elements as described above, the download and install time required to install application sub-package 24A may be lower than if the entire application sub-package 24A were sent to computing device 2 or if just uncompressed application elements already installed at computing device 2 were stripped out of application sub-package 24A. The network resources and computing resources like memory, storage, and processing capability, may also be reduced.

The techniques described herein may also improve the functioning of the computing device 2 itself by minimizing the impact that installing application 18 has on the battery life and/or processing capabilities of computing device 2. By determining whether to send one or more application elements from application provider server 4 to computing device 2 or whether to obtain the one or more application elements from an application that is already installed at computing device 2 based at least in part on the type of network connection established by computing device 2, the available bandwidth of the network connection established by computing device 2, the current processor and/or memory load of computing device 2, and/or the remaining battery life of computing device 2, the techniques described herein may adaptively install application 18 at computing device 2 in a way that minimizes the impact that installing application 18 has on the battery life and/or processing capabilities of computing device 2.

Figure 2:
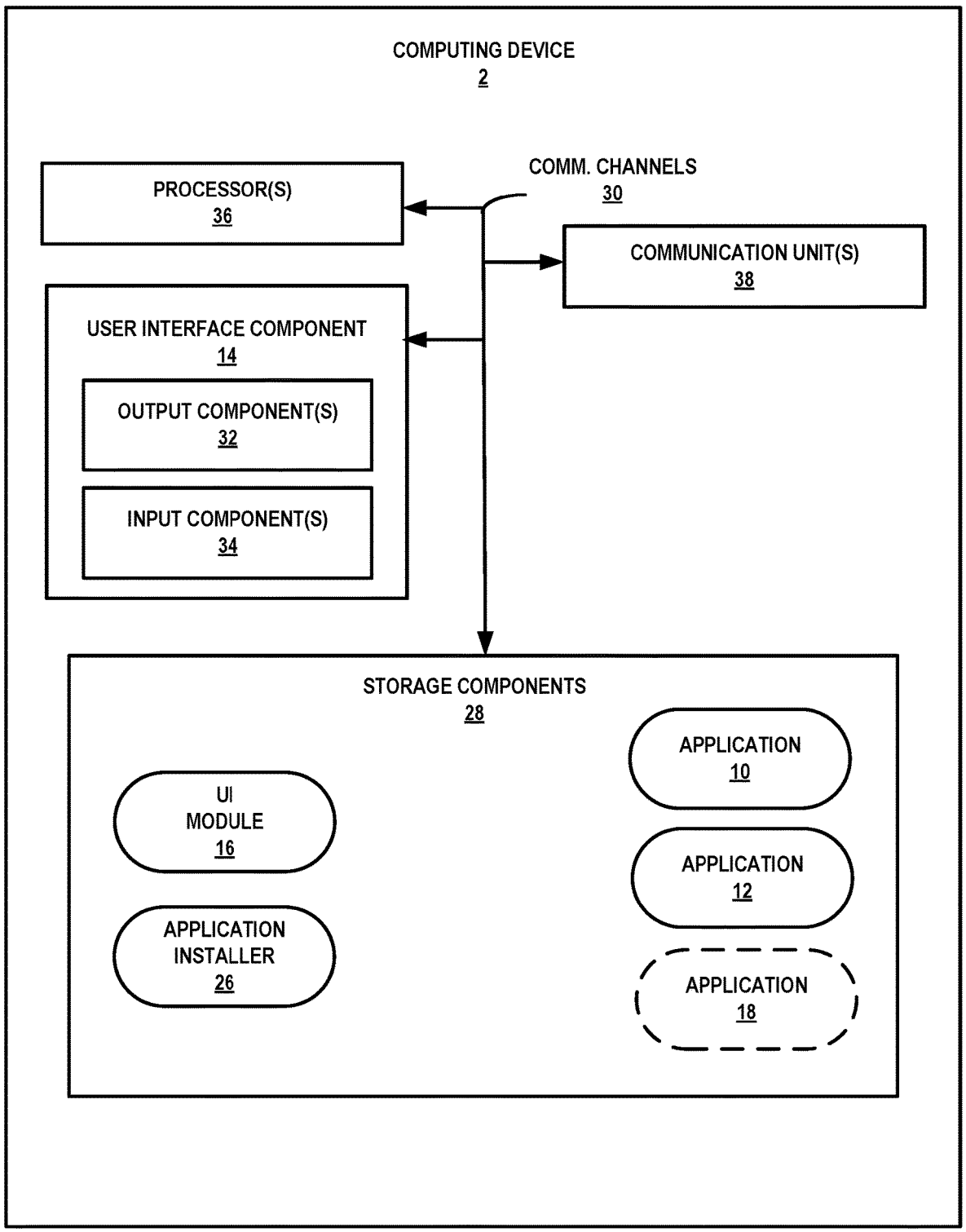
FIG. 2 is a block diagram illustrating an example computing device that is configured to install one or more applications by leveraging the application elements of applications that are already installed at the computing device, in accordance with one or more aspects of the present disclosure.

FIG. 2 is a block diagram illustrating an example computing device that is configured to install one or more applications by leveraging the application elements of applications that are already installed at the computing device, in accordance with one or more aspects of the present disclosure. FIG. 2 illustrates only one particular example of computing device 2, and many other examples of computing device 2 may be used in other instances and may include a subset of the components included in example computing device 2 or may include additional components not shown in FIG. 2.

As shown in the example of FIG. 2, computing device 2 includes user interface component (UIC) 14, one or more processors 36, one or more communication units 38, and one or more storage components 28. UIC 14 includes output component 32 and input component 34. Storage components 28 of computing device 2 include UI module 16, application installer 26, and applications 10, 12, and 18.

Communication channels 30 may interconnect each of the components 14, 36, 38, and 28 for inter-component communications (physically, communicatively, and/or operatively). In some examples, communication channels 30 may include a system bus, a network connection, an inter-process communication data structure, or any other method for communicating data.

One or more communication units 38 of computing device 2 may communicate with external devices (e.g., application provider server 4) via one or more wired and/or wireless networks (e.g., network 8) by transmitting and/or receiving network signals on the one or more networks. Examples of communication units 38 include a network interface card (e.g. such as an Ethernet card), an optical transceiver, a radio frequency transceiver, a global positioning satellite (GPS) receiver, or any other type of device that can send and/or receive information. Other examples of communication units 38 may include short wave radios, cellular data radios, wireless network radios, as well as universal serial bus (USB) controllers.

One or more input components 34 of computing device 2 may receive input. Examples of input are tactile, audio, and video input. Input components 34 of computing device 2, in one example, includes a presence-sensitive input device (e.g., a touch sensitive screen, a presence-sensitive display), mouse, keyboard, voice responsive system, video camera, microphone or any other type of device for detecting input from a human or machine. In some examples, input components 34 may include one or more sensor components such as one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 32 of computing device 2 may generate output. Examples of output are tactile, audio, and video output. Output components 32 of computing device 2, in one example, includes a PSD, sound card, video graphics adapter card, speaker, cathode ray tube (CRT) monitor, liquid crystal display (LCD), or any other type of device for generating output to a human or machine.

UIC 14 may include output component 32 and input component 34. Output component 32 may be a display component, such as a screen at which information is displayed by UIC 14 and input component 34 may be a presence-sensitive input component that detects an object at and/or near output component 32. Output component 32 and input component 34 may be a speaker and microphone pair or any other combination of one or more input and output components, such as input components 34 and output components 32. In the example of FIG. 2, UIC 14 may present a user interface.

While illustrated as an internal component of computing device 2, UIC 14 may also represent an external component that shares a data path with computing device 2 for transmitting and/or receiving input and output. For instance, in one example, UIC 14 represents a built-in component of computing device 2 located within and physically connected to the external packaging of computing device 2 (e.g., a screen on a mobile phone). In another example, UIC 14 represents an external component of computing device 2 located outside and physically separated from the packaging or housing of computing device 2 (e.g., a monitor, a projector, etc. that shares a wired and/or wireless data path with computing device 2).

One or more storage components 28 within computing device 2 may store information for processing during operation of computing device 2 (e.g., computing device 2 may store data accessed by UI module 16, application installer 26, and applications 10, 12, and 18 during execution at computing device 2). In some examples, storage component 28 is a temporary memory, meaning that a primary purpose of storage component 28 is not long-term storage. Storage components 28 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 28, in some examples, also include one or more computer-readable storage media. Storage components 28 in some examples include one or more non-transitory computer-readable storage mediums. Storage components 28 may be configured to store larger amounts of information than typically stored by volatile memory. Storage components 28 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 28 may store program instructions and/or information (e.g., data) associated with UI module 16, application installer 26, and applications 10, 12, and 18. Storage components 28 may include a memory configured to store data or other information associated with UI module 16, application installer 26, and applications 10, 12 and 18.

One or more processors 36 may implement functionality and/or execute instructions associated with computing device 2. Examples of processors 36 include application processors, display controllers, auxiliary processors, one or more sensor hubs, and any other hardware configured to function as a processor, a processing unit, or a processing device. UI module 16, application installer 26, and applications 10, 12 and 18 may be operable by processors 36 to perform various actions, operations, or functions of computing device 2. For example, processors 36 of computing device 2 may retrieve and execute instructions stored by storage components 28 that cause processors 36 to perform the operations of UI module 16, application installer 26, and applications 10, 12 and 18. The instructions, when executed by processors 36, may cause computing device 2 to store information within storage components 28.

UI module 16 may manage user interactions with UIC 14 and other components of computing device 2. UI module 16 may cause UIC 14 to output a user interface as a user of computing device 2 views output and/or provides input at UIC 14.

Applications 10 and 12 are applications that are already installed at computing device 2, and may be executed by processors 36 to perform various functions.

Application installer 26 may be executed by processors 36 to install and update applications at computing device 2. Application installer 26 may perform the functions of an application marketplace application that allows users to interact with application installer 26 via UIC 14 to browse, download, and install applications from an application provider server, such as application provider server 4. UIC 14 may receive input indicative of a request to install application 18 at computing device 2, and UI module 16 may forward to application installer 26 the request to install application 18 at computing device 2.

In response to receiving the request to install application 18 at computing device 2, application installer may send, via communication units 38, a request for application 18 to application provider 6 at application provider server 4. The request may include information that may be used by application provider 6 to determine how application elements of application 18 are sent to computing device 2. For example, such information may include the current location (e.g., geographical location) of computing device 2, the type of network connection established by communication units 38, the available bandwidth of the network connection established by communication units 38, the current processor and/or memory load of processors 36, the remaining battery life of computing device 2, user preferences regarding the download of application 18, the applications that are currently installed at computing device 2, the application elements of the applications that are currently installed at computing device 2, and the like.

In response to sending the request for application 18 to application provider 6, application installer 26 may receive from application provider 6 a first one or more application elements of application 18. Application installer 26 may receive the first one or more application elements of application 18 in a compressed form in order to reduce the amount of time required to download the first one or more application elements and reduce the network resources used in the download.

Each application element of the first one or more application elements may have been compressed (e.g., by application provider server 4) using a compression algorithm that is specific to the application element type of the application element, to reduce the size of the first one or more application elements that are transmitted via a network to computing device 2. Thus, if the first one or more application elements of application 18 includes two or more application elements of two or more application element types, each of the two or more types of application elements of the two or more application elements may have been compressed using a different compression algorithm. To aid in decompressing application elements received from application provider 6, computing device may store compression dictionaries in storage components 28 for application elements that have been compressed using a dictionary-based compression algorithm in which a block of data, such as a string, can be replaced by reference to the position of the block of data in the compression dictionaries. The compression dictionaries can include an index of blocks of data which the dictionary-based compression algorithm may index into in order to compress and decompress data. To decompress application elements that have been compressed using a dictionary-based compression algorithm, application installer 26 may substitute the references in the compressed graphics elements with blocks of data at the corresponding referenced locations in the compression dictionaries.

Application installer 26 may not receive every one of the plurality of application elements of application 18 from application provider 6. Instead, application installer may receive a request to obtain a second one or more application elements of application 18 from one or more applications that are already installed at computing device 2. The request may identify one or more corresponding application elements of applications that are already installed at computing device 2 that correspond to the second one or more application elements of application 18, so that application installer 26 may obtain the second one or more application elements by copying or patching the corresponding one or more application elements of applications that are already installed at computing device 2. For example, the request may include an indication of the locations of the one or more corresponding application elements in storage components 28, an indication of unique identifiers of the one or more corresponding application elements, and the like, that may enable computing device 2 to identify the one or more corresponding application elements out of the application elements of the applications that are already installed at computing device 2.

In some examples, when downloading application 18, computing device 2 may initiate two or more download streams from application provider 6. Each of the two or more download streams may be used to download different portions of application 18 from application provider 6. For example, one download stream may be used to download a stripped version of application 18 (i.e., a version that does not include the application elements already installed at computing device 2) and another download stream may be used to download patches that need to be applied to the application elements already installed at computing device 2 in order for application 18 to use the application elements.

While application provider 6 is creating and sending the patches and the stripped version of application 18, computing device 2 may create copies of the one or more application elements that are going to be reused by application 18, including the application elements that require patching. If any of the application elements are stored in a compressed format at computing device 2, application installer 26 may decompress the copy of the compressed application element(s). In various instances, it may take less time to create a copy of the application elements and decompress the copies of the compressed application element(s) than is required to download the patches.

Once each patch is downloaded to computing device 2, application installer 26 decompresses each patch and applies the uncompressed patch to the corresponding uncompressed copy of the application element. In instances where application 18 requires that the application element be stored in a compressed format, after the patch is applied, application installer 26 recompresses the patched version of the application element.

Once application installer 26 has received or obtained every application element of application 18, including the first and second application elements, and has patched the application elements needing to be patched, application installer 26 may install application 18 using the application elements of application 18. Installing application 18 may include creating a package for application 18 in which application elements of application 18 are stored within the package in a way that the package represents an application that computing device 2 can execute to perform one or more functions.

Figure 3:
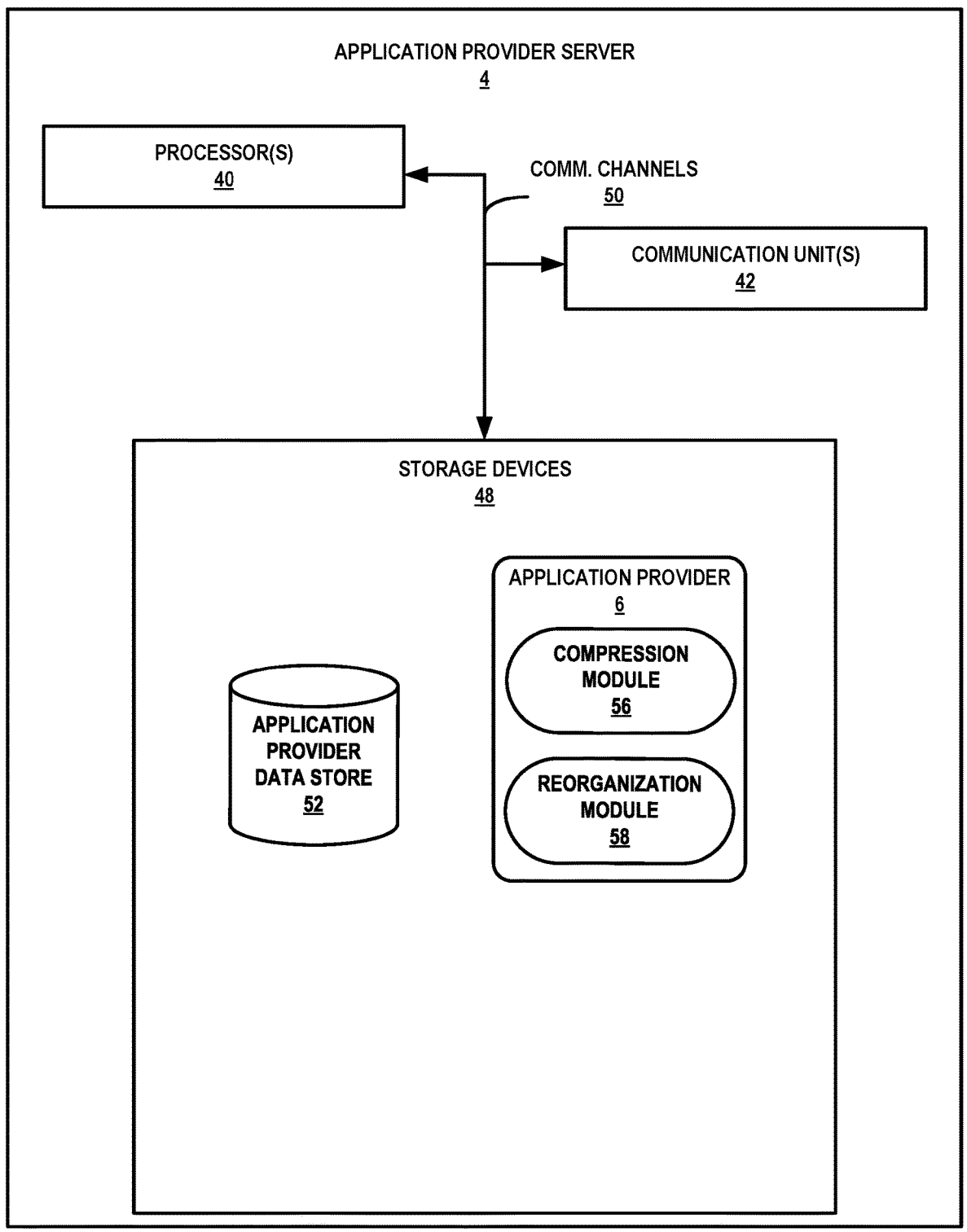
FIG. 3 is a block diagram illustrating an example application provider server, in accordance with one or more aspects of the present disclosure.

FIG. 3 is a block diagram illustrating an example application provider server, in accordance with one or more aspects of the present disclosure. FIG. 3 illustrates only one particular example of application provider server 4, and many other examples of application provider server 4 may be used in other instances. In other examples, application provider servers may include a subset of the components included in example application provider server 4 or may include additional components not shown in FIG. 3. For example, application provider server 4 may comprise a cluster of servers, and each of the servers comprising the cluster of servers making up application provider server 4 may include all, or some, of the components described herein in FIG. 3, to perform the techniques disclosed herein.

As shown in the example of FIG. 3, application provider server 4 includes one or more processors 40, one or more communication units 42, and one or more storage device(s) 48. Storage devices 48 include application provider 6 and application provider data store 52.

Processors 40 are analogous to processors 36 of computing device 2 of FIG. 2. Communication units 42 are analogous to communication units 38 of computing device 2 of FIG. 2. Storage devices 48 are analogous to storage components 28 of computing device 2 of FIG. 2. Communication channels 50 are analogous to communication channels 30 of computing device 2 of FIG. 2 and may therefore interconnect each of the components 40, 42, and 48 for inter-component communications. In some examples, communication channels 50 may include a system bus, a network connection, an inter-process communication data structure, or any other method for communicating data.

In some examples, storage devices 48 is a temporary memory, meaning that a primary purpose of storage devices 48 is not long-term storage. In this example, storage devices 48 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, storage devices 48 may also include one or more computer-readable storage media. Storage devices 48 in some examples include one or more non-transitory computer-readable storage mediums. Storage devices 48 may be configured to store larger amounts of information than typically stored by volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with application provider 6 and application provider data store 52. Storage devices 48 may include a memory configured to store data or other information associated with application provider 6 and application provider data store 52.

Application provider data store 52 may be configured to store information received by, created by, and/or otherwise associated with application provider 6. For example, application provider data store 52 may store applications that may be downloaded from application provider server 4 for installation at a computing device, such as computing device 2. Such applications may be uploaded by application developers to application provider server 4, so that the applications may be available for download by application provider 6 to computing devices.

Application provider data store 52 may also store information regarding the applications that are installed at computing devices that communicate with application provider server 4. For example, for computing device 2, application provider data store 52 may store indications of the applications that are installed at computing device 2, the versions of the applications that are installed at computing device 2, the application elements making up the applications that are installed at computing device 2, applications that were previously installed at computing device 2 but are no longer installed at computing device 2, and the like.

Application provider 6 may execute at processors 40 and may be configured to send applications and patches to computing devices in order to install applications at the computing devices and/or update applications that are installed at the computing devices 2. Application provider 6 may receive a request for an application from computing device 2 and may, in response to receiving the request from computing device 2, send one or more application elements of the requested application to computing device 2.

Instead of sending all of the application elements of the requested application, application provider 6 may determine whether one or more application elements of the application can be obtained from one or more applications that are already currently installed at computing device 2. If so, application provider 6 may direct computing device 2 to obtain such one or more application elements from the one or more applications that are already currently installed at computing device 2 and may refrain from sending such one or more application elements to computing device 2.

Application provider data store 52 may store indications of applications that are currently installed at various computing devices that communicate with application provider server 4. For example, when application provider 6 receives a request for an application from computing device 2, application provider server 4 may update the application provider data store 52 to include an indication that the requested application is installed at computing device 2. In addition, when applications are deleted or otherwise uninstalled from computing device 2, application provider server 4 may receive an indication of the application being deleted or uninstalled from computing device 2, and may update the application provider data store 52 to include an indication that the application is no longer installed at computing device 2. In this way, application provider data store 52 may store indications of applications that are currently installed at computing devices that communicate with application provider server 4.

Application provider 6 may, based on the information stored in application provider data store 52 (or the information provided in the request, where the information is not stored), determine one or more application elements of the requested application that can be obtained from applications that are currently installed at the requesting computing device (e.g., computing device 2). An application element of the requested application can be obtained from applications that are currently installed at the requesting computing device if 1) the applications that are currently installed at the requesting computing device includes the same application element as the application element of the requested application, or 2) the applications that are currently installed at the requesting computing device include an application element that can be patched to be the same as the application element of the requested application. For example, if the application element of the requested application is a library, the application element may be obtained from applications that are currently installed at computing device 2 if the applications include the same version of the library, or an older version of the library that can be updated via a patch to the same version of the library.

When application provider 6 determines that one or more application elements of the requested application can be obtained from applications that are currently installed at the requesting computing device, application provider 6 may determine to refrain from sending the one or more application elements of the requested application to the requesting computing device, and to instead direct the requesting computing device to obtain the one or more application elements of the requested application from applications that are currently installed at the requesting computing device. In other situations, application provider 6 may send the one or more application elements of the requested application to the requesting computing device even when the one or more application elements of the requested application can be obtained from applications that are currently installed at the requesting computing device.

Application provider 6 may determine whether to send one or more application elements of the requested application to the requesting computing device even when the one or more application elements of the requested application can be obtained from applications that are currently installed at the requesting computing device based on a variety of factors. Such factors may include user sensitivity to the amount of time for installing the requested application, characteristics of the network connection of the requesting computing device, the available bandwidth of the network connection of the requesting computing device, the type of the network connection of the requesting computing device, the location of the computing device, the processor and/or memory utilization of any patches to be applied by the requesting computing device to obtain the one or more application elements, the remaining battery life of the computing device, and the like. Application provider server 4 may receive indications of such factors from the requesting computing device, and may store such information in application provider data store 52. Application provider 6 may generate a profile of the requesting computing device based on these and other factors to determine whether to send the one or more application elements of the requested application to the requesting computing device.

In some examples, application provider 6 may refrain from sending the one or more application elements of the requested application to the requesting computing device if computing device 2 is connected to application provider 6 via a cellular data connection instead of Wi-Fi, and may send the one or more application elements of the requested application to the requesting computing device if the requesting device is connected to application provider 6 via Wi-Fi.

In some examples, application provider 6 may refrain from sending the one or more application elements of the requested application to the requesting computing device if the requesting computing device is connected to application provider 6 via a metered network connection, and may send the one or more application elements of the requested application to the requesting computing device if the requesting device is connected to application provider 6 via an unmetered network connection or a network connection with unlimited data. In another example, application provider 6 may determine the amount of network bandwidth that is available to the requesting computing device, and may send the one or more application elements of the requested application to the requesting computing device if the requesting computing device's available network bandwidth is above a threshold.

In some examples, when obtaining the one or more application elements of the requested application from applications that are currently installed at the requesting computing device includes applying a patch to application elements of the currently-installed applications, application provider 6 may determine the processor and/or memory utilization of the patches to be applied by the requesting computing device to the application elements of the currently-installed application, as well as the current processor and/or memory utilization of the requesting computing device and the remaining battery life of the requesting computing device. Because applying a patch to application elements of the currently-installed applications may potentially be processor-intensive and memory-intensive, and may potentially drain the battery of the requesting computing device, application provider 6 may determine whether the requesting computing device has the available resources to apply the patch in a way that is faster and/or more resource efficient than downloading the one or more application elements of the requested application from the application provider server 4.

Application provider 6 may generate and send, to the requesting device, a stripped version of the requested application and an indication of one or more application elements of the requested application that are to be obtained from applications that are already installed at the requesting device. The stripped version of the requested application is a version of the requested application that does not include the one or more application elements that are to be obtained from applications already installed at the requesting device. If necessary, application provider 6 may also generate and send one or more patches to the requesting computing device that may be used to update the one or more application elements of the applications that are already installed at the requesting computing device. In various instances, the stripped version of the requested application and the patches may be sent to the requesting computing devices in parallel using different download streams. By sending the patches in a separate download stream from the stripped version of the requested application, the requesting computing device may begin performing and typically will complete the decompression, patching, and recompression techniques described herein prior to the stripped version of the requested application being fully downloaded to the requesting device.

In accordance with aspects of the present disclosure, to further reduce the amount of data that is sent from application provider server 4 and a computing device (e.g., computing device 2) to send one or more application elements to the computing device to install or update an application at the computing device, application provider server 4 may compress application elements that are sent from application provider server 4 to the computing device. In particular, compression module 56 may execute at processors 40 to apply different compression techniques to different types of application elements, and may tune parameters of the compression techniques used for application elements of the same type based on the content of the application elements. In this way, compression module 56 may be able to better compress different application elements of different types compared with applying a single compression technique to compress different application elements of different types.

Compression module 56 may determine the compression techniques to be applied to application elements based at least in part on the type of the application elements that compression module 56 is to compress. Thus, when compression module 56 encounters a plurality of application elements that includes at least a first application element of a first type and a second application element of a second type that is different from the first type, compression module may apply a first compression technique to the first application element of a first type, and may apply a second compression technique different from the first compression technique to the second application element of the second type. In this way, compression module 56 may, for each of a plurality of different types of application elements, apply a different compression technique to compress each of the plurality of different types of application elements.

As discussed previously, an application may include multiple application elements of different application element types. For example, an application may include one or more application elements that are binary content containing native code that is architecture specific. To compress application elements of this type, compression module 56 may use a compression technique that is optimized for compressing native code, such as compression techniques that align code at a per-CPU instruction level, compared with compression techniques that treat the native code as an arbitrary blob of text.

An application may also include one or more application elements that are resources such as images, audio files, video files, and the like. For application elements of this type, compression module 56 may rely on the existing compression provided by the native file formats of the images, audio files, video files, and the like. In this case, compression module 56 may not necessarily further compress such application elements.

An application may also include one or more application elements that are managed code. Managed code may be executable code that is executed under the management of a virtual machine, such as compiled Java code, compiled Dalvik Executable code, and the like. For application elements of this type, compression module 56 may use a compression technique that is optimized for compressing the managed code. For example, such a compression technique may tune a dictionary-based compression algorithm for common phrases in the compiled Java code or the compiled Dalvik Executable code.

Application provider data store 52 may store compression dictionaries for compression techniques that uses a dictionary-based compression algorithm in which a block of data, such as a string, can be replaced by reference to the position of the block of data in the compression dictionaries. The compression dictionaries can include an index of blocks of data which the dictionary-based compression algorithm may index into to compress and decompress data.

In accordance with aspects of the present disclosure, to further reduce the amount of data that is sent from application provider server 4 and a computing device (e.g., computing device 2) to send one or more application elements to the computing device, application provider server 4 may transform application elements of an application to reduce the size of patches that may be applied to update previous or older versions of the application elements. For example, application provider 6 may reorganize the code of a new version of a library to reduce the size of a patch that is used to update previous versions of the library to the new version of the library.

Such reorganization may be helpful for application elements that are managed code. For managed code, small changes to the output code generated by compilers may result in large differences in the arguments created by offsets. Thus, the size of a patch for patching managed code may be relatively large compared with the size of the managed code, even for incremental changes to the managed code.

A patch for updating a previous version of an application element to an updated version of the application element is a compact encoding of the differences between the updated version of the application element and the previous version of the application element. The larger the size of the patch, the longer it may take to download and apply the patch. By reducing the size of patches, application provider 6 may decrease the amount of time it takes to download the patch from application provider server 4 and the network resources required to transmit the patch, and may also decrease the processing needed at the computing device to apply the patch.

Application provider 6 may include reorganization module 58 that executes at processors 40 to reorganize the code of one or more application elements based on previous versions of the one or more application elements, in order to reduce the size of patches that are used to patch the previous versions of the one or more application elements to update them to the one or more application elements. For example, when application provider 6 receives an upload of a new version of an application element, application provider 6 may reorganize the code within the new version of the application element based on the previous version of the application element to reduce the size of a patch that can be applied to update the previous version of the application element to the new version of the application element. Application provider 6 may generate the patch based at least in part on the difference between the new version of the application element containing the reorganized code and the previous version of the application element.

For application elements that include code files, such as in the case of managed code or native code, reorganization module 58 can reduce the size of patches that patch a previous version of an application element to a new version of an application element by maximizing the number of contiguous blocks in the code of the new version of the application element that has a matching contiguous block in the code of the previous version of the application element. The contiguous blocks in the new version of the application element that has a matching contiguous block in the previous version of the application element may be referred to as shared contiguous blocks. The greater the number of shared contiguous blocks, the fewer substitutions may be encoded in the patch, thereby reducing the size of the patch.

In order to reorganize a new version of an application element, reorganization module 58 may obtain a profile of a previous version of the application element that is to be patched. In some examples, application provider 6 may perform profiling of the previous version of the application element. In other examples, application provider 6 may receive the profile of the previous version of the application element from another computing device.

The profile for an application element may include information derived from the application element that describes the code (e.g., managed code) in the application elements, such as the methods, constants, classes, and the like that are in the code, and describes the ordering of the methods, constants, and classes in the code. When an application element includes more than one code file, each code file may have an associated profile that describes the code within the code file.

Reorganization module 58 may use the profile of the previous version of the application element to reorganize a new version of the application element. Reorganization module 58 may find all of the methods, constants, and classes in the one or more code files included in the new version of the application element that corresponds to the methods, constants, and classes in the previous version of the application element, as indicated by the profile. Reorganization module 58 may reorganize the code files by grouping such methods, constants, and classes together in a code file in the new version of the application element, or in a newly created code file in the new version of the application element. Reorganization module 58 may also rearrange the ordering of the methods, constants, and classes that are grouped together so that they match the ordering of methods, constants, and classes in the profile. Reorganization module 58 may adjust all internal references in the code files of the new version of the application element to the methods, constants, and classes to account for their new positions within the code files. If necessary, application provider 6 may re-sign the binary making up the new version of the application element.

In some examples, reorganizing the code files of a new version of the application element according to the techniques described above may increase the number of code files in the application element. For example, reorganization module 58 may split a single code file into a plurality of code files in the new version of the application element, where each code file is each associated with a single profile.

Reorganizing the code files of a new version of the application element according to the techniques described above may increase the number and the size of contiguous blocks in the new version of the application element that match contiguous regions in the previous version of the application element. By increasing the number and size of matching contiguous regions, the techniques described above reduce the size of the patches that are used to update the previous version of the application element to the new version of the application element.

Figure 4:
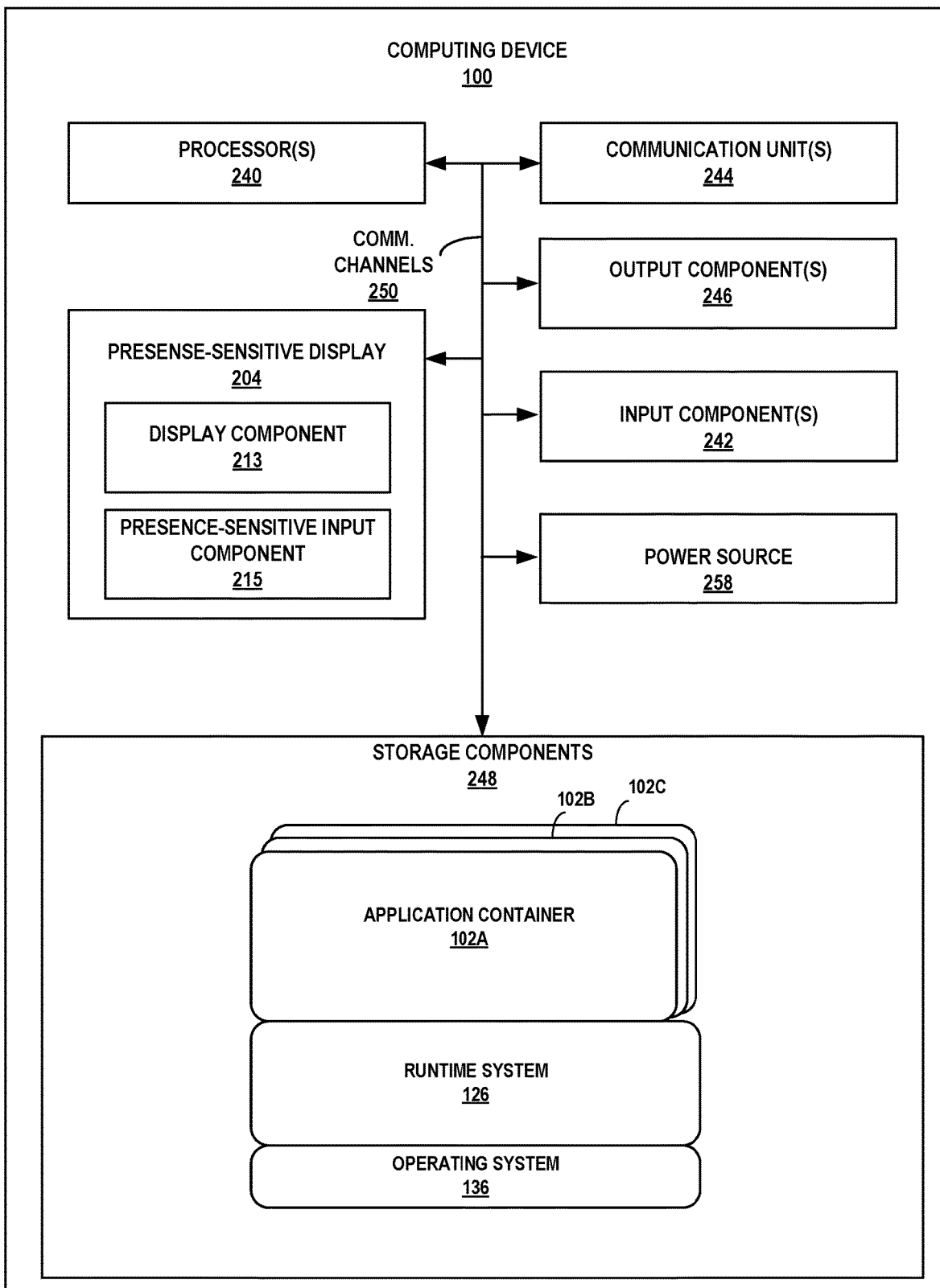
FIG. 4 is a conceptual diagram illustrating an example computing device with application containers for dynamically loading installable sub-packages, in accordance with techniques of this disclosure.

FIG. 4 is a conceptual diagram illustrating an example computing device with application containers for dynamically loading installable sub-packages, in accordance with techniques of this disclosure. FIG. 4 illustrates only one particular example of computing device 100. Many other examples of computing device 100 may be used in other instances and may include a subset of the components included in example computing device 100 or may include additional components not shown example computing device 100 in FIG. 4.

As shown in the example of FIG. 4, computing device 100 includes one or more processors 240, one or more input components 242, one or more communication units 244, one or more output components 246, one or more storage components 248, and presence-sensitive display 212. Storage components 248 of computing device 100 include application containers 102, runtime system 126, and operating system 136.

Processors 240 are analogous to processors 36 of computing device 2 of FIG. 2. Communication units 244 are analogous to communication units 38 of computing device 2 of FIG. 2. Storage components 248 are analogous to storage components 28 of computing device 2 of FIG. 2. Communication channels 250 are analogous to communication channels 30 of computing device 2 of FIG. 2 and may therefore interconnect each of the components 204, 240, 242, 244, 246, 248, and 258 for inter-component communications. In some examples, communication channels 250 may include a system bus, a network connection, an inter-process communication data structure, or any other method for communicating data.

One or more processors 240 may implement functionality and/or execute instructions within computing device 100. For example, processors 240 on computing device 100 may receive and execute instructions stored by storage components 248 that provide the functionality of operating system 136, application containers 102A-102C (collectively, "application containers 102"), and runtime system 126. These instructions executed by processors 240 may cause computing device 100 to store and/or modify information, within storage components 248 during program execution. Processors 240 may execute instructions of operating system 136, application containers 102, and runtime system 126 to perform one or more operations. That is, operating system 136, application containers 102, and runtime system 126 may be operable by processors 240 to perform various functions described in this disclosure.

One or more input components 242 of computing device 100 may receive input. Examples of input are tactile, audio, kinetic, and optical input, to name only a few examples. Input components 242 of computing device 100, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 246 of computing device 100 may generate output. Examples of output are tactile, audio, and video output. Output components 246 of computing device 100, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, presence-sensitive display 204 of computing device 100 may include functionality of input component 242 and/or output components 246. In the example of FIG. 4, presence-sensitive display 204 may include a presence-sensitive input component 215, such as a presence-sensitive screen or touch-sensitive screen. In some examples, presence-sensitive input component 215 may detect an object at and/or near presence-sensitive input component 215. As one example range, presence-sensitive input component 215 may detect an object, such as a finger or stylus that is within two inches or less of presence-sensitive input component 215. Presence-sensitive input component 215 may determine a location (e.g., an (x,y) coordinate) of the presence-sensitive input component at which the object was detected. In another example range, presence-sensitive input component 215 may detect an object two inches or less from presence-sensitive input component 215 and other ranges are also possible. Presence-sensitive input component 215 may determine the location of presence-sensitive input component 215 selected by a user's finger using capacitive, inductive, and/or optical recognition techniques.

In some examples, presence-sensitive display 204 may also provide output to a user using tactile, audio, or video stimuli as described with respect to output component 246. For instance, presence-sensitive display 204 may include display component 213 that presents a graphical user interface. Display component 213 may be any type of output component that provides visual output, such as described with respect to output components 246. While illustrated as an integrated component of computing device 100, presence-sensitive display 204 may, in some examples, be an external component that shares a data path with other components of computing device 100 for transmitting and/or receiving input and output. For instance, presence-sensitive display 204 may be a built-in component of computing device 100 located within and physically connected to the external packaging of computing device 100 (e.g., a screen on a mobile phone). In another example, presence-sensitive display 204 may be an external component of computing device 100 located outside and physically separated from the packaging of computing device 100 (e.g., a monitor, a projector, etc. that shares a wired and/or wireless data path with a tablet computer). In some examples, presence-sensitive display 204, when located outside of and physically separated from the packaging of computing device 100, may be implemented by two separate components: a presence-sensitive input component 215 for receiving input and a display component 213 for providing output.

As shown in FIG. 4, computing device 100 may include a power source 258. In some examples, power source 258 may be a battery. Power source 258 may provide power to one or more components of computing device 100. Examples of power source 258 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 258 may have a limited capacity (e.g., 1000-3000 mAh).

Computing device 100 includes functionality to support applications that are split into various application sub-packages, such as applications 10, 12, and 18 of FIG. 1, which include sub-packages 20, 22, and 24, respectively. A sub-package may include resources (e.g., images, text, videos or any other non-compiled data), security and/or signing information, version information and/or dependency information, or any other information for an application. A software developer may design an application to be comprised of multiple, user-defined sub-packages. Each user-defined sub-package may include a set of executable components that collectively provide a discrete set of functionality. For instance, a software developer may design a navigation application with multiple different user interfaces. Each user interface may include a different set of user interface elements and corresponding behaviors. As such, each user interface may be implemented with a distinct set of executable components. For instance, the navigation application may include a turn-by-turn navigation user interface, a point-of-interest user interface (e.g., displaying details for a point of interest on a map), and a settings user interface. The software developer may design the application with three different sub-packages, where each sub-package includes a set of executable components to implement the functionality for the respective user interface.

By allowing the software developer to design an application with separate sub-packages for separate sets of functionality, application containers 102 may enable an application to execute at computing device 100 without all of its respective execution components for all of its sub-packages being locally resident on computing device 100. In this way, the initial execution of an application may not require the retrieval and/or installation of all sub-packages but rather only a subset of sub-packages that include executable components implementing the requested functionality. Moreover, by packaging multiple, executable components in a single sub-package, the retrieval and/or installation of executable components may occur on a sub-package basis according to requested functionality (e.g., to render a particular user interface) rather retrieving and installing executable components on an executable component-by-executable component basis, which may have poorer performance and/or result in a poorer user experience. Because the entire set of sub-packages for an application need not be stored locally on computing device 100, the initial installation and/or initial execution of an application at computing device 100 may require less time than if the entire application needed to be downloaded from a remote computing system, installed, and executed by computing device 100. As such, a user may experience greater responsiveness from the application and/or performance for the behavior of the application. Network resources required for the initial installation may also be reduced as compared to downloading the entire application.

In order to enable execution of such applications, computing device 100 includes application containers 102 and runtime system 126. Runtime system 126 implements an execution model for applications that are built according to a particular programming language in which the applications are written and built or compiled. Runtime system 126 may include one or more libraries and/or services that are accessible to application containers 102 during execution. As further described in this disclosure, each application container 102 may correspond to a distinct application. Runtime system 126 may include thread-management services, screen drawing and user-interface rendering component, and inter- and intra-application messaging services to name only a few example services. Application containers 102 may access the services through Application Programming Interfaces (APIs) that are exposed by runtime system 126. In some examples, runtime system 126 may be executed as one or more processes and/or threads. One or more of the processes and/or threads may execute with or without operating system privileges.

In instances where a user requests execution of an application, such as application 10 of FIG. 1, runtime system 126 receives a request to execute particular functionality of an application or install an entire application not currently installed. For instance, a user may provide a user input at presence-sensitive display 204 to install an application that is not currently installed at the computing device, where the application may be an application sub-package which provides a discrete set of functionality. Presence-sensitive display 204 may cause runtime system 126 to generate an event that corresponds to selecting an icon for the application. Responsive to determining that an application container for maintaining installable application sub-packages of the application is not allocated in volatile memory of storage components 248, runtime system 126 retrieves an application definition from a remote computing system (e.g., application provider 6 of FIG. 1). For instance, runtime system 126 causes one of communication units 244 to send a request to the remote computing system for the application definition. The application definition may define a plurality of mappings between the installable sub-packages of the application and user-specified identifiers.

Responsive to allocating application container 102A in the volatile memory of computing device 100, runtime system 126 may initiate, based at least in part on a user-specified identifier of the request, the particular functionality of the application. Responsive to determining, by application container 102A executing at the computing device, based at least in part on the application definition and the user-specified identifier, that an installable sub-package for the particular functionality is not stored at computing device 100, application container 102A may retrieve the installable sub-package that includes a plurality of executable components from a remote computing system (e.g., application provider 6).

Rather than downloading each executable component on a component-by-component basis and rather than downloading all of the executable components of the application, computing device 100 may retrieve only the one or more sub-packages that correspond to discrete sets of functionality needed by the application. Moreover, rather than having an application loader identify, at run-time and during execution, each separate executable component that is not stored locally, and retrieving and installing such executable components separately on a component-by-component basis, application container 102A may download a sub-package for particular functionality based on the software developer's identification of the sub-package with a user-specified identifier. As such, retrieving sub-packages may be a less granular but more efficient retrieval mechanism than retrieving and installing such executable components separately on a component-by-component basis. Application container 102A may execute using one or more executable components of the retrieved sub-package, the particular functionality of the application.

When downloading and installing the application sub-packages from application provider 6, application provider 6 may determine that an application element of the application sub-package can be obtained from the applications or application sub-packages (e.g. applications 10 and 12 and sub-packages 20 and 22, in the example of FIG. 1) that are already installed at computing device 100 and determine that the application element needs to be patched before being usable by application sub-package. In response, application provider 6 may generate a stripped version of the application sub-package that does not include the application element already installed at computing device 100. In some instances, even though the stripped version of application sub-package is already compressed using a standard compression algorithm, application provider 6 may apply a second, different compression algorithm to generate a further compressed and, thus, smaller in size, version of the stripped application sub-package in order to further reduce the amount of data required to be sent to computing device 100.

Application provider 6 may also generate a patch that will be applied by computing device 100 to the application element in order to change the application element into the version of the application element required by the application sub-package. Application provider 6 compresses the patch and sends the patch to computing device 2 using one of the download streams established with computing device 100. Application provider 6 also sends the stripped version of the application sub-package to computing device 100 using another one of the download streams established with computing device 100. Typically, the compressed patch will be smaller in size than the stripped version of the application sub-package and, thus, will require less time to transmit to computing device 100.

As applying patches to compressed application elements, such as libraries, produces patched versions of the elements that are inefficient (i.e., larger in size than if the patch were applied to an uncompressed version of the same application element), it is preferable to apply patches to uncompressed versions of the application elements. Thus, in accordance with the techniques of this disclosure, while application provider 6 is creating and sending the patch and the stripped version of the application sub-package, runtime system 126 may create copies of the one or more application elements that are going to be reused by the application sub-package. If any of the application elements are stored in a compressed format at computing device 100, runtime system 126 may decompress the copy of the compressed application element(s). In various instances, it may take less time to create a copy of the application elements and decompress the copies of the compressed application element(s) than is required to download the patches.

Once each patch is downloaded to computing device 2, runtime system 126 decompresses each patch and applies the uncompressed patch to the corresponding uncompressed copy of the application element. In instances where the application sub-package requires that the application element be stored in a compressed format, after the patch is applied, runtime system 126 recompresses the patched version of the application element. Typically, this download, decompression, patching, and recompression process requires less time than is required to download the stripped version of the application sub-package. In this way, techniques of this disclosure enable usage of compressed application elements already installed at computing device 100 when downloading and installing application sub-packages even though the compressed application elements may require patching before being usable by the application sub-package without producing suboptimal patched versions of the application elements.

In some examples, each respective application container 102 may correspond to a distinct application. For instance, an operating system may include a user interface that allows a user to select different applications (e.g., from a menu or icon grid) based on respective icons that correspond to the different applications. For example, a user may select an email client icon from the operating system user interface that causes execution of the email client application with its own separate application container. Unlike an application container, an extension or other sub-application (e.g., plugins, JavaScript, Java Virtual Machine, etc.,) of a web browser may not be represented as a separate applications to be launched in a user interface of an operating system. For instance, even if a web browser created a separate process for each tab of a tabbed interface, each of the tabs may not be represented as a separate application within a user interface of the operating system as independently launchable applications.

An application container, as described in this disclosure, may differ from a web browser because an application container may include a container runtime. As described in this disclosure, a container runtime of an application container may include libraries, but may also expose operating system APIs to executable components of sub-packages within an application container. Unlike an application container, a web browser may not expose such operating system APIs to extensions or other sub-applications within the web browser.

An application container, as described in this disclosure, may differ from a web browser because the application container may receive user-specified identifiers (e.g., URI's) from a supervisor component (e.g., in a runtime system or operating system) that is external to the application container that may cause the retrieval of sub-packages that change the execution behavior or appearance of the application without additional user intervention. The user-specified identifiers may originate from other applications executing on the same computing device or different computing devices, and upon being received by an application container may automatically change the execution behavior or appearance of the application. By contrast, a web browser may receive user input (e.g., inputting text for a URL) within the web browser itself and not from a source external to the application container, e.g., either a supervisor component or another application external to the web browser. Additionally, a web browser may not include a router and/or application definition, as described within an application container of this disclosure, to perform a lookup of user-specified identifiers and change the execution of the application represented by the application container. Unlike an application container, a web browser may not include a callback interface, which receives and buffers lifecycle calls to change the operation of sub-packages within the application container.

In some examples, a web browser may include core functionality (e.g., rendering engine) and one or more third-party extensions, plugins, and/or sub-applications. A web browser, unlike an application container, may not function properly or execute at all without all of the web browser's core functionality being stored locally and available to the computing device for execution. By contrast, an application container may function properly with only a sub-set of its core functionality (e.g., only sub-packages for a subset of user interfaces) stored locally and available to the computing device for execution.

Figure 5:
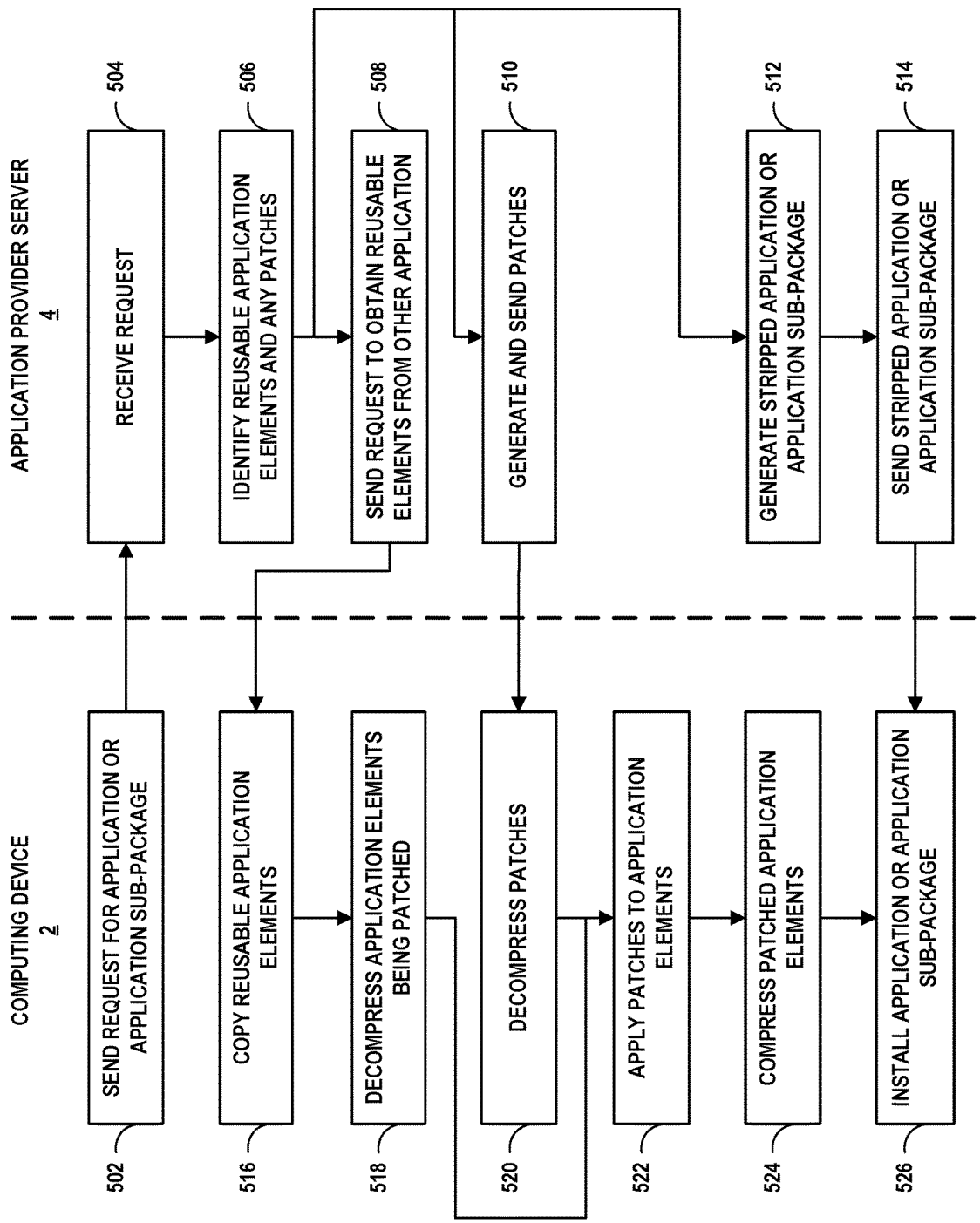
FIG. 5 is a flowchart illustrating example operations performed by a computing system that includes one or more processors executing at a computing device and one or more processors executing at an application provider server.

FIG. 5 is a flowchart illustrating example operations performed by a computing system that includes one or more processors executing at a computing device and one or more processors executing at an application provider server, in accordance with one or more aspects of the present disclosure. As shown in FIG. 5, operations 502, 516, 518, 520, 522, 524, and 526 are described below in the context of computing device 2 shown in FIGS. 1, 2, and 4, and operations 504, 506, 508, 510, 512, and 514 are described below in the context of application provider server 4 shown in FIGS. 1 and 3.

Computing device 2 may receive a user input to install an application that is not currently installed at the computing device, wherein a plurality of applications are currently installed at the computing device, and wherein each of the plurality of applications includes a respective plurality of application elements. In response to receiving the user input, in operation, computing device may send a request to application provider server 4 to download the application (e.g., application 18) that is to be installed at computing device 2 (502). For example, the request may include an identifier for application 18 that enables computing device 2 to identify application 18 out of the applications stored at application provider server 4. While this example is described as an initial install of application 18, the techniques may also be applied to the installation of a sub-package of an application already installed at computing device 2. For example, these techniques may be applied to the installation of sub-package 24B of application 18 where other application sub-packages of application 18 (e.g., sub-package 24A and 24O) are already installed at computing device 2.

Application provider server 4 receives the request (504) and, in response, application provider server 4 may determine whether one or more application elements of the application 18 can be obtained from another application that is already installed at computing device 2 and whether any of the reusable application elements require patching (506).

If application provider server 4 determines that one or more application elements of application 18 can be obtained from another application that is already installed at computing device 2, application provider server 4 may refrain from sending the one or more application elements of application 18 to computing device 2, and may instead send to computing device 2 a request to obtain the one or more elements of application 18 from another application that is installed at computing device 2 (508). The request can include an indication of the application element(s) of the applications currently installed at the computing device which are to be reused during installation of the application 18.

For application elements of application 18 that can be obtained from another application that is installed at computing device 2 and that need to be patched, application provider server 4 generates the requisite patches (or retrieves a previously generated patch from a storage repository, for example) and sends the patches to computing device 2 (510). In various instances, the patches are sent using one of a plurality of download streams established between computing device 2 and application provider server 4. The request can include an indication of the application element(s) of the applications currently installed at the computing device which are to be patched before installation of the application 18.

Application provider server 4 generates a version of application 18 that does not include the application elements that are already installed at computing device 2 (512). The generated version of application 18 may be referred to as a stripped application. After the stripped version of application 18 is generated, application provider server sends the stripped version to computing device 2 (514) for download. In various instances, the stripped application may be sent using another download stream from the plurality of download streams between computing device 2 and application provider server 4. This other download stream is typically different from the download stream used to send the patches to computing device 2.

While application provider server 4 is generating the patches and the stripped application, computing device 2 may at least start creating copies of the application elements that are going to be reused (516) and, in instances where the application elements need to be patched and are stored in a compressed format, at least start uncompressing the application elements (518). As the patches sent by application provider server 4 are sent in a compressed format, after computing device 2 receives the patches, computing device 2 decompresses the patches (520). After both the application elements being patched and the patches are decompressed, computing device 2 applies the patches to the application elements (522) and the recompresses the application elements (524) into a compressed version usable by application 18. Typically, these decompressing, patching, and recompressing steps occur while the stripped application is being downloaded from application provider server 4.

Computing device 2 may install application 18 using the patched version of the application elements, any other copies of application elements that were already stored at computing device 2 but that did not need to be patched, and the stripped version of application 18 downloaded from application provider server 4 (526). Optionally, the download of the stripped application and the patch is performed over two or more separate streams. In some examples, decompressing the patch, applying the patch, and compressing the patched application element are performed while the stripped version of the application is being downloaded. In some examples, decompressing the first application element is performed while the patch is being downloaded. These approaches may reduce the use of network resources as compared to downloading an entire application without increasing latency of the install.

The following numbered examples may illustrate one or more aspects of the present disclosure.

Example 1: A method includes: receiving, by a computing device, a user input to install an application that is not currently installed at the computing device, wherein a plurality of applications are currently installed at the computing device, and wherein each of the plurality of applications includes a respective plurality of application elements; responsive to receiving the user input, sending, to an application provider, a request to install the application; receiving, from the application provider, an indication of one or more application elements from the respective plurality of application elements included in the plurality of applications currently installed at the computing device, wherein the one or more application elements are to be reused during installation of the application, wherein the one or more application elements include a first application element that is to be updated from a current version to a different version required by the application, and wherein the first application element is stored at the computing device in a compressed format; downloading, by the computing device and from the application provider, a patch to be applied to the first application element and a stripped version of the application that does not include the one or more application elements to be reused during installation of the application; decompressing, by the computing device, the first application element to generate a decompressed version of the first application element; decompressing, by the computing device, the patch to generate a decompressed version of the patch; applying, by the computing device, the decompressed version of the patch to the decompressed version of the first application element to generate a patched application element; compressing, by the computing device, the patched application element to generate a compressed patched application element that is the different version of the first application element required by the application; and installing, by the computing device, the application at the computing device using the compressed patched application element, the stripped version of the application, and the one or more application elements other than the first application element.

Example 2. The method of example 1, wherein: the application that is not currently installed at the computing device is an application sub-package for a particular application from the plurality of applications already installed at the computing device; the application sub-package is not currently installed at the computing device; the particular application comprises a plurality of application sub-packages; a subset of the plurality of application sub-packages are currently installed at the computing device; each application sub-package from the plurality of application sub-packages of the particular application are separately installable and provide a discrete set of functionality for the particular application; the stripped version of the application is a stripped version of the application sub-package; and installing the application comprises installing the application sub-package at the computing device using the compressed patched application element, the stripped version of the application sub-package, and the one or more application elements other than the first application element.

Example 3. The method of example 2, wherein receiving the indication of the one or more application elements, downloading the patch and the stripped version of the application sub-package, decompressing the first application element, decompressing the patch, applying the decompressed version of the patch, compressing the patched application element, and installing the application sub-package are performed while the particular application is executing at the computing device.

Example 4. The method of example 2 or example 3, wherein: the user input is received while the particular application is executing at the computing device; and the user input to install the application is a user input that requests previously unused functionality of the particular application.

Example 5. The method of example 4, wherein execution of the particular application is managed by an application container executing at the computing device, the method further comprising: responsive to receiving the user input, determining, by the application container, whether an installable application sub-package that provides functionality of the particular application requested by the user input is not installed at the computing device; and responsive to determining that the installable application sub-package is not installed at the computing device, generating, by the application container, the request to install the application sub-package.

Example 6. The method of any of examples 1 to 5, wherein downloading the patch and the stripped version of the application comprises: initiating, by the computing device, download of the patch to be applied to the first application element; and initiating, by the computing device, download of the stripped version of the application that does not include the one or more application elements to be reused during installation of the application, Example 7. The method of any of examples 1 to 6, further comprising: establishing, by the computing device and with the application provider, at least two download streams, wherein initiating download of the patch includes initiating download of the patch using a first download stream from the at least two download streams, and wherein initiating download of the stripped version of the application includes initiating download of the stripped version of the application using a second download stream from the at least two download streams.

Example 8. The method of any of examples 1 to 7, wherein decompressing the patch, applying the patch, and compressing the patched application element are performed while the stripped version of the application is being downloaded.

Example 9. The method of any of examples 1 to 8, wherein decompressing the first application element is performed while the patch is being downloaded.

Example 10. The method of any of examples 1 to 9, further comprising: creating, by the computing device, a respective copy of each application element from the one or more application elements currently stored at the computing device including a copy of the first application element;

Example 11. A computing device comprising: one or more processors; a presence-sensitive display that detects a user input to install an application that is not currently installed at the computing device; a communication unit; and a computer-readable storage medium that stores a plurality of applications, wherein each of the plurality of applications includes a respective plurality of application elements and stores instructions that, when executed by the one or more processors, causes the one or more processor to: responsive to receiving the user input, send, to an application provider via the communication unit, a request to install the application; receive, from the application provider via the communication unit, an indication of one or more application elements from the respective plurality of application elements included in the plurality of applications currently installed at the computing device, wherein the one or more application elements are to be reused during installation of the application, wherein the one or more application elements include a first application element that is to be updated from a current version to a different version required by the application, and wherein the first application element is stored at the computing device in a compressed format; retrieve, from the application provider via the communication unit, a patch to be applied to the first application element and a stripped version of the application that does not include the one or more application elements to be reused during installation of the application; decompresses the first application element to generate a decompressed version of the first application element; decompresses the patch to generate a decompressed version of the patch; applies the decompressed version of the patch to the decompressed version of the first application element to generate a patched application element; compresses the patched application element to generate a compressed patched application element that is the different version of the first application element required by the application; and install the application at the computing device using the compressed patched application element, the stripped version of the application, and the one or more application elements other than the first application element.

Example 12: The computing device of example 11, wherein: the application that is not currently installed at the computing device is an application sub-package for a particular application from the plurality of applications already installed at the computing device; the application sub-package is not currently installed at the computing device; the particular application comprises a plurality of application sub-packages; a subset of the plurality of application sub-packages are currently installed at the computing device; each application sub-package from the plurality of application sub-packages of the particular application are separately installable and provide a discrete set of functionality for the particular application; the stripped version of the application is a stripped version of the application sub-package; and the instructions that cause the one or more processors to install the application comprises instructions that cause the one or more processors to install the application sub-package at the computing device using the compressed patched application element, the stripped version of the application sub-package, and the one or more application elements other than the first application element.

Example 13. The computing device of example 12, wherein the instructions that cause the one or more processors to receive the indication of the one or more application elements, download the patch and the stripped version of the application sub-package, decompress the first application element, decompress the patch, apply the decompressed version of the patch, compress the patched application element, and install the application sub-package while the particular application is executing at the computing device.

Example 14. The computing device of example 12 or example 13, wherein: the user input is received while the particular application is executing at the computing device; and the user input to install the application is a user input that requests previously unused functionality of the particular application.

Example 15. The computing device of example 14, wherein execution of the particular application is managed by an application container executing at the computing device, and wherein the instructions for the application container executing at the computing device cause the one or more processors to: responsive to receiving the user input, determine whether an installable application sub-package that provides functionality of the particular application requested by the user input is not installed at the computing device; and, responsive to determining that the installable application sub-package is not installed at the computing device, generate the request to install the application sub-package.

Example 16. The computing device of any of examples 11 to 15, wherein the instructions that cause the one or more processors to download the patch and the stripped version of the application comprise instructions that cause the one or more processors to initiate download of the patch to be applied to the first application element; and initiate download of the stripped version of the application that does not include the one or more application elements to be reused during installation of the application, Example 17. The computing device of any of examples 11 to 16, wherein the instructions further cause the one or more processors to establish, with the application provider, at least two download streams, wherein the instructions that cause the one or more processors to initiate download of the patch include instructions that cause the one or more processors to initiate download of the patch using a first download stream from the at least two download streams, and wherein the instructions that cause the one or more processors to initiate download of the stripped version of the application include instructions that cause the one or more processors to initiate download of the stripped version of the application using a second download stream from the at least two download streams.

Example 18. The computing device of any of examples 11 to 17, wherein the instructions that cause the one or more processors to decompress the patch, apply the patch, and compress the patched application element are executed while the stripped version of the application is being downloaded.

Example 19. The computing device of any of examples 11 to 18, wherein the instructions that cause the one or more processors to decompress the first application element are executed while the patch is being downloaded.

Example 20. The computing device of any of examples 11 to 19, wherein the instructions further cause the one or more processors to create a respective copy of each application element from the one or more application elements currently stored at the computing device including a copy of the first application element.

Example 21. A non-transitory computer-readable storage medium encoded with instructions that, when executed, cause one or more processors of a computing device to: receive an indication of a user input to install an application that is not currently installed at the computing device, wherein a plurality of applications are currently installed at the computing device, and wherein each of the plurality of applications includes a respective plurality of application elements; responsive to receiving the indication of the user input, send, to an application provider, a request to install the application; receive, from the application provider, an indication of one or more application elements from the respective plurality of application elements included in the plurality of applications currently installed at the computing device, wherein the one or more application elements are to be reused during installation of the application, wherein the one or more application elements include a first application element that is to be updated from a current version to a different version required by the application, and wherein the first application element is stored at the computing device in a compressed format; download, from the application provider, a patch to be applied to the first application element and a stripped version of the application that does not include the one or more application elements to be reused during installation of the application; decompress the first application element to generate a decompressed version of the first application element; decompress the patch to generate a decompressed version of the patch; apply the decompressed version of the patch to the decompressed version of the first application element to generate a patched application element; compress the patched application element to generate a compressed patched application element that is the different version of the first application element required by the application; and install the application at the computing device using the compressed patched application element, the stripped version of the application, and the one or more application elements other than the first application element.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:
1. A method comprising:
during an install process of a particular application sub-package from a plurality of application sub-packages for an application, wherein each application sub-package from the plurality of application sub-packages is separately installable and provides a discrete set of functionality for the particular application, wherein a subset of application sub-packages from the plurality of application sub-packages of the application is currently installed at a computing device, and wherein the particular application sub-package from the plurality of application sub-packages for the application is not currently installed at the computing device:
receiving, by a computing device and from an application provider, an indication of one or more application elements from a respective plurality of application elements included in a plurality of applications currently installed at the computing device, wherein the one or more application elements are to be reused during installation of the particular application sub-package, wherein the one or more application elements include a first application element that is to be updated from a current version to a different version required by the particular application sub-package, and wherein the first application element is stored at the computing device in a compressed format;
creating, by the computing device, a respective copy of each application element from the one or more application elements currently stored at the computing device including a copy of the first application element, wherein the copy of the first application element is in the compressed format;
downloading, by the computing device and from the application provider, a patch to be applied to the first application element and a stripped version of the particular application sub-package that does not include the one or more application elements to be reused during installation of the application;

applying, by the computing device, the patch to the copy of the first application element to generate a patched application element copy; and installing, by the computing device, the particular application sub-package at the computing device using the patched application element copy, the stripped version of the particular application sub-package, and the respective copy of each of the one or more application elements other than the first application element.

2. The method of claim 1, further comprising:

decompressing, by the computing device, the copy of the first application element to generate a decompressed version of the copy of the first application element; and decompressing, by the computing device, the patch to generate a decompressed version of the patch, wherein applying the patch includes applying the decompressed version of the patch to the decompressed version of the copy of the first application element to generate the patched application element copy.

3. The method of claim 2, further comprising:

compressing, by the computing device, the patched application element copy to generate a compressed patched application element that is the different version of the first application element required by the application, wherein the patched application element copy used when installing the application at the computing device is the compressed patched application element.

4. The method of claim 2, wherein receiving the indication of the one or more application elements, downloading the patch and the stripped version of the application sub-package, decompressing the first application element, decompressing the patch, applying the decompressed version of the patch, compressing the patched application element copy, and installing the application sub-package are performed while the particular application is executing at the computing device.

5. The method of claim 1, further comprising:

receiving, by the computing device, a user input to install the application sub-package while the particular application is executing at the computing device, wherein the user input requests previously unused functionality of the particular application.

6. The method of claim 5, wherein execution of the particular application is managed by an application container executing at the computing device, the method further comprising:

responsive to receiving the user input, determining, by the application container, whether an installable application sub-package that provides functionality of the particular application requested by the user input is not installed at the computing device; and responsive to determining that the installable application sub-package is not installed at the computing device, generating, by the application container, the request to install the application sub-package.

7. The method of claim 1, wherein downloading the patch and the stripped version of the application comprises:

initiating, by the computing device, download of the patch to be applied to the copy of the first application element; and initiating, by the computing device, download of the stripped version of the application that does not include the one or more application elements to be reused during installation of the application.

8. The method of claim 7, further comprising:

establishing, by the computing device and with the application provider, at least two download streams, wherein initiating download of the patch includes initiating download of the patch using a first download stream from the at least two download streams, and wherein initiating download of the stripped version of the application includes initiating download of the stripped version of the application using a second download stream from the at least two download streams.

9. A computing device comprising:

one or more processors;

a communication unit; and a computer-readable storage medium that stores a plurality of applications, wherein each of the plurality of applications includes a respective plurality of application elements and stores instructions that, when executed by the one or more processors, causes the one or more processors to, during an install process of a particular application sub-package from a plurality of application sub-packages for an application, wherein each application sub-package from the plurality of application sub-packages is separately installable and provides a discrete set of functionality for the particular application, wherein a subset of application sub-packages from the plurality of application sub-packages of the application is currently installed at a computing device, and wherein the particular application sub-package from the plurality of application sub-packages for the application is not currently installed at the computing device:

receive, from an application provider via the communication unit, an indication of one or more application elements from a respective plurality of application elements included in a plurality of applications currently installed at the computing device, wherein the one or more application elements are to be reused during installation of of the particular application sub-package, wherein the one or more application elements include a first application element that is to be updated from a current version to a different version required by the particular application sub-package, and wherein the first application element is stored at the computing device in a compressed format;

create a respective copy of each application element from the one or more application elements currently stored at the computing device including a copy of the first application element, wherein the copy of the first application element is in the compressed format;

retrieve, from the application provider via the communication unit, a patch to be applied to the first application element and a stripped version of the particular application sub-package that does not include the one or more application elements to be reused during installation of the application;

apply the patch to the copy of the first application element to generate a patched application element copy; and install the particular application sub-package at the computing device using the patched application element copy, the stripped version of the particular application sub-package, and the respective copy of each of the one or more application elements other than the first application element.

10. The computing device of claim 9, wherein the instructions further cause the one or more processors to:
 decompress the copy of the first application element to generate a decompressed version of the copy of the first application element; and
 decompress the patch to generate a decompressed version of the patch,
 wherein the instructions that cause the one or more processors to apply the patch cause the one or more processors to apply the decompressed version of the patch to the decompressed version of the copy of the first application element to generate the patched application element copy.

11. The computing device of claim 10, wherein the instructions further cause the one or more processors to:
 compress the patched application element copy to generate a compressed patched application element that is the different version of the first application element required by the application,
 wherein the patched application element copy used when installing the application at the computing device is the compressed patched application element.

12. The computing device of claim 9, further comprising:
 a presence-sensitive display that detects a user input to install the application sub-package while the particular application is executing at the computing device, wherein the user input requests previously unused functionality of the particular application.

13. The computing device of claim 9, wherein the instructions that cause the one or more processors to retrieve the patch and the stripped version of the application includes instructions that cause the one or more processors to:
 initiate download of the patch to be applied to the first application element; and
 initiate download of the stripped version of the application that does not include the one or more application elements to be reused during installation of the application.

14. A non-transitory computer-readable storage medium encoded with instructions that, when executed, cause one or more processors of a computing device to, during an install process of a particular application sub-package from a plurality of application sub-packages for an application, wherein each application sub-package from the plurality of application sub-packages is separately installable and provides a discrete set of functionality for the particular application, wherein a subset of application sub-packages from the plurality of application sub-packages of the application is currently installed at a computing device, and wherein the particular application sub-package from the plurality of application sub-packages for the application is not currently installed at the computing device:
 receive, from an application provider, an indication of one or more application elements from a respective plurality of application elements included in a plurality of applications currently installed at the computing device, wherein the one or more application elements are to be reused during installation of the particular application sub-package, wherein the one or more application elements include a first application element that is to be updated from a current version to a different version required by the particular application sub-package, and wherein the first application element is stored at the computing device in a compressed format;
 create a respective copy of each application element from the one or more application elements currently stored at the computing device including a copy of the first application element, wherein the copy of the first application element is in the compressed format;
 retrieve, from the application provider, a patch to be applied to the first application element and a stripped version of the particular application sub-package that does not include the one or more application elements to be reused during installation of the application;
 apply the patch to the copy of the first application element to generate a patched application element copy; and
 install the particular application sub-package at the computing device using the patched application element copy, the stripped version of the particular application sub-package, and the respective copy of each of the one or more application elements other than the first application element.

15. The non-transitory computer-readable storage medium of claim 14, wherein the instructions further cause the one or more processors to:
 decompress the copy of the first application element to generate a decompressed version of the copy of the first application element;
 decompress the patch to generate a decompressed version of the patch, wherein the instructions that cause the one or more processors to apply the patch cause the one or more processors to apply the decompressed version of the patch to the decompressed version of the copy of the first application element to generate the patched application element copy; and
 compress the patched application element copy to generate a compressed patched application element that is the different version of the first application element required by the application, wherein the patched application element copy used when installing the application at the computing device is the compressed patched application element.

16. The non-transitory computer-readable storage medium of claim 14, wherein the instructions further cause the one or more processors to:
 receive an indication of a user input to install the application sub-package while the particular application is executing at the computing device, wherein the user input requests previously unused functionality of the particular application.

* * * * *